United States Patent
Miller

(10) Patent No.: US 9,209,673 B2
(45) Date of Patent: Dec. 8, 2015

(54) DEVICES, SYSTEMS, AND METHODS FOR ENERGY CONVERSION

(75) Inventor: F. Troy Miller, Logan, UT (US)

(73) Assignee: Creative Energy Solutions, LLC, Logan, UT (US)

(*) Notice: Subject to any disclaimer, the term of this patent is extended or adjusted under 35 U.S.C. 154(b) by 802 days.

(21) Appl. No.: 13/402,758

(22) Filed: Feb. 22, 2012

(65) Prior Publication Data

US 2013/0057101 A1 Mar. 7, 2013

Related U.S. Application Data

(60) Provisional application No. 61/445,293, filed on Feb. 22, 2011.

(51) Int. Cl.
*H02K 21/00* (2006.01)
*H02K 49/10* (2006.01)
*H02K 99/00* (2014.01)

(52) U.S. Cl.
CPC ............ *H02K 49/102* (2013.01); *H02K 57/006* (2013.01); *H02K 49/106* (2013.01); *H02K 49/108* (2013.01); *H02K 57/003* (2013.01)

(58) Field of Classification Search
CPC . H02K 57/003; H02K 57/006; H02K 49/102; H02K 49/106; H02K 49/108
USPC ......................................... 310/103, 104, 152
See application file for complete search history.

(56) References Cited

U.S. PATENT DOCUMENTS

| | | | | |
|---|---|---|---|---|
| 1,277,371 A | * | 9/1918 | Boyle | H02K 19/102 310/103 |
| 2,481,360 A | * | 9/1949 | Sprenger | H02K 49/106 235/91 M |
| 3,483,412 A | * | 12/1969 | Bakker et al. | 310/103 |
| 3,510,706 A | * | 5/1970 | Agaba | H02K 19/102 310/103 |
| 3,730,488 A | * | 5/1973 | Gardner, Jr. | 366/262 |
| 4,284,871 A | | 8/1981 | Mawson et al. | |
| 6,084,326 A | * | 7/2000 | Nagai et al. | 310/80 |
| 2009/0001833 A1 | | 1/2009 | Freixas Vila | |
| 2009/0309444 A1 | | 12/2009 | Freixas Vila | |
| 2013/0175890 A1 | * | 7/2013 | Atwood | H02K 57/006 310/46 |

FOREIGN PATENT DOCUMENTS

JP 2003092870 3/2003

OTHER PUBLICATIONS

Sear et al., University Physics, Addison-Wesley Publishing Company, Sixth Edition, 1984, p. 350.*
Griffiths, Introduction to Electrodynamics, Prentice Hall, Third Edition, 1999, p. 207.*
International Search Report and Written Opinion dated Aug. 30, 2012 for PCT/US2012/026183.

* cited by examiner

Primary Examiner — Dang Le
(74) Attorney, Agent, or Firm — Stoel Rives LLP

(57) ABSTRACT

Disclosed herein are embodiments of devices, systems, and methods for converting magnetic energy into one or more other forms of energy, or stated otherwise, for deriving power in a desired format from magnetic energy. In one system, energy provided by a magnetic field of a magnetic source is converted into rotational energy of one or more components of a system. The system can include a magnetic source that is coupled with a rotational component so as to instigate and/or maintain rotation of the component, and is decoupled from the component due at least in part to torque provided by another magnetic source.

26 Claims, 22 Drawing Sheets

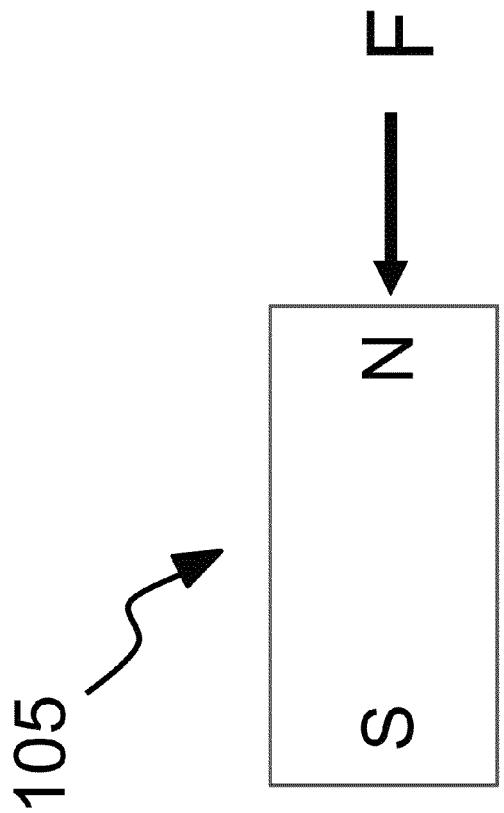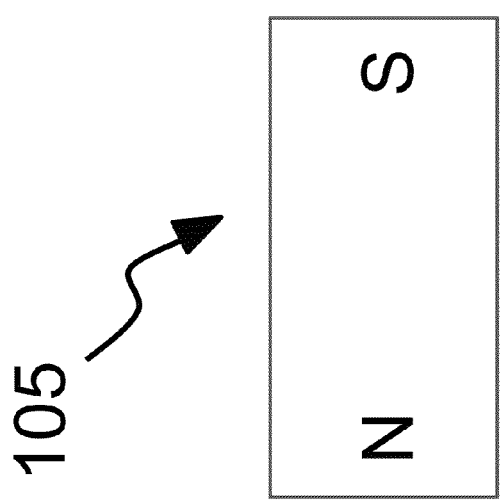
FIG. 2

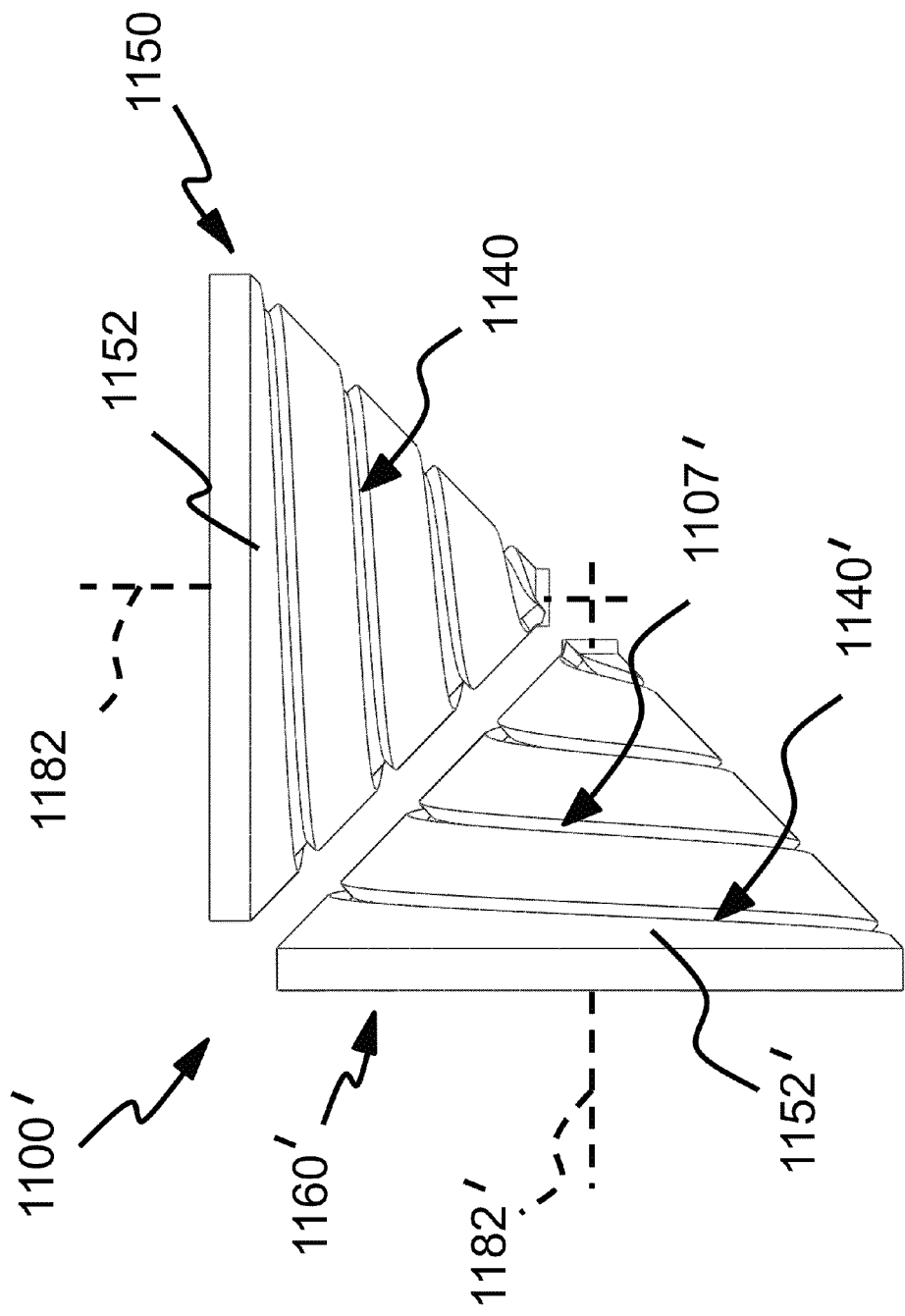

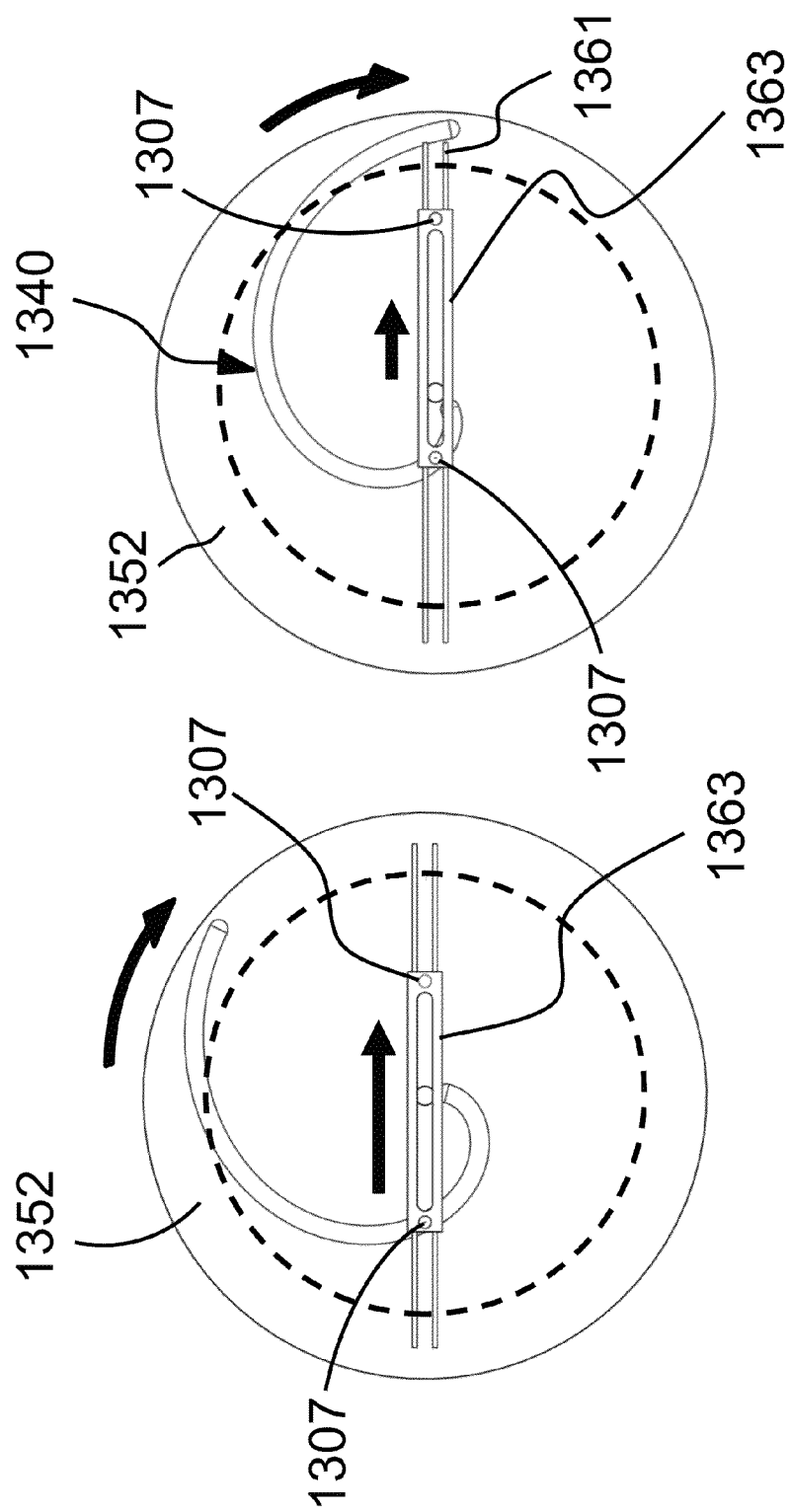

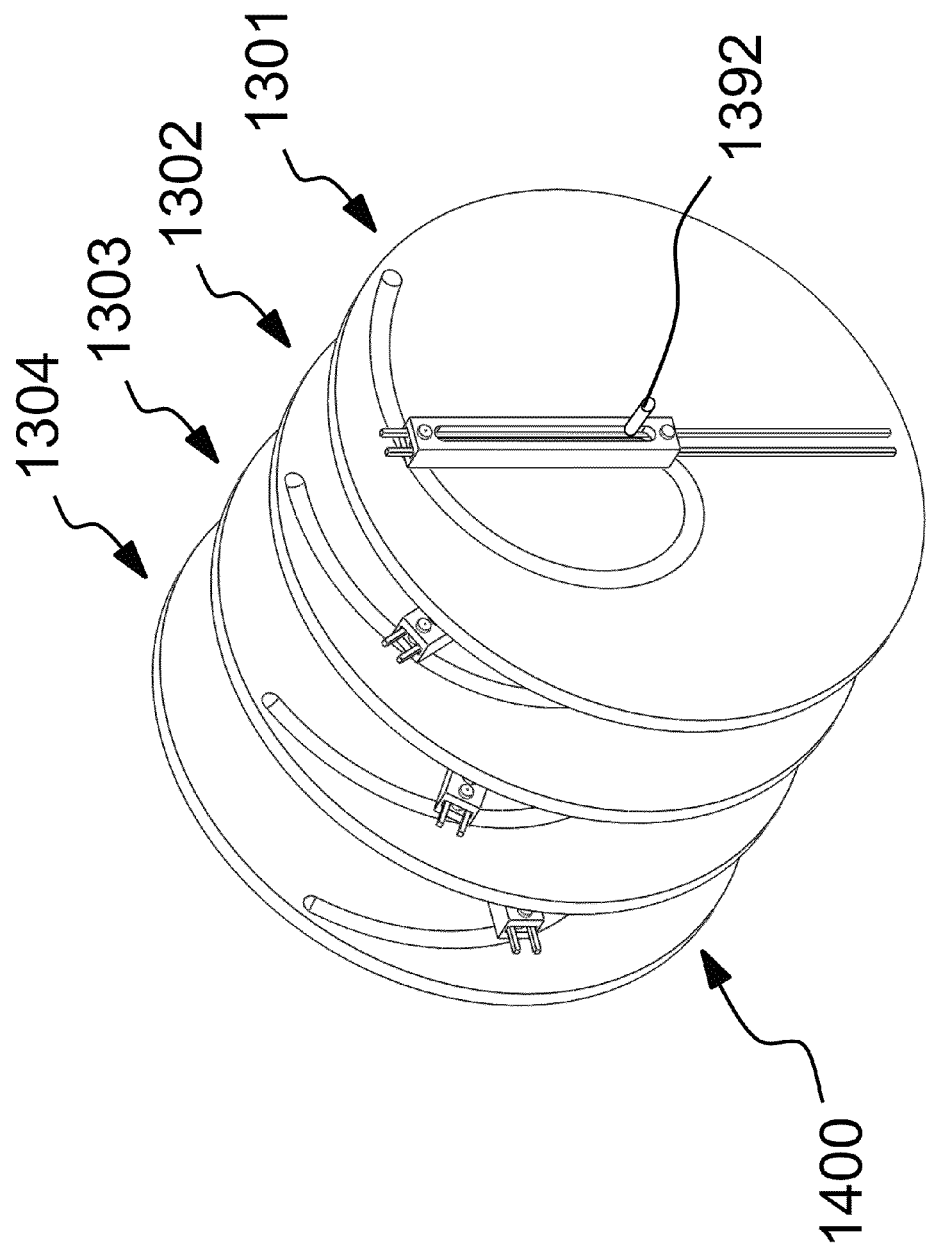

US 9,209,673 B2

DEVICES, SYSTEMS, AND METHODS FOR ENERGY CONVERSION

CROSS-REFERENCE TO RELATED APPLICATIONS

This application claims the benefit under 35 U.S.C. §119 (e) of U.S. Provisional Patent Application No. 61/445,293, titled DEVICES, SYSTEMS, AND METHODS FOR ENERGY CONVERSION, which was filed on Feb. 22, 2011, the entire contents of which are hereby incorporated by reference herein.

TECHNICAL FIELD

Embodiments disclosed herein relate generally to devices, systems, and methods for converting magnetic energy into one or more other energy forms.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 2 is a schematic view of two magnetic sources interacting with each other in the presence of an external force;

FIG. 17B is an elevation view of another embodiment of a system configured to continuously convert magnetic energy into rotational energy;

FIGS. 19A-19D are plan views of another embodiment of a system configured to continuously convert magnetic energy into rotational energy, which is shown in different operational positions; and FIG. 20 is a perspective view of another embodiment of a system configured to continuously convert magnetic energy into rotational energy, wherein the system includes multiple systems, such as those shown in FIGS. 19A-19D, which are operatively coupled with each other.

DETAILED DESCRIPTION

Figure 1:
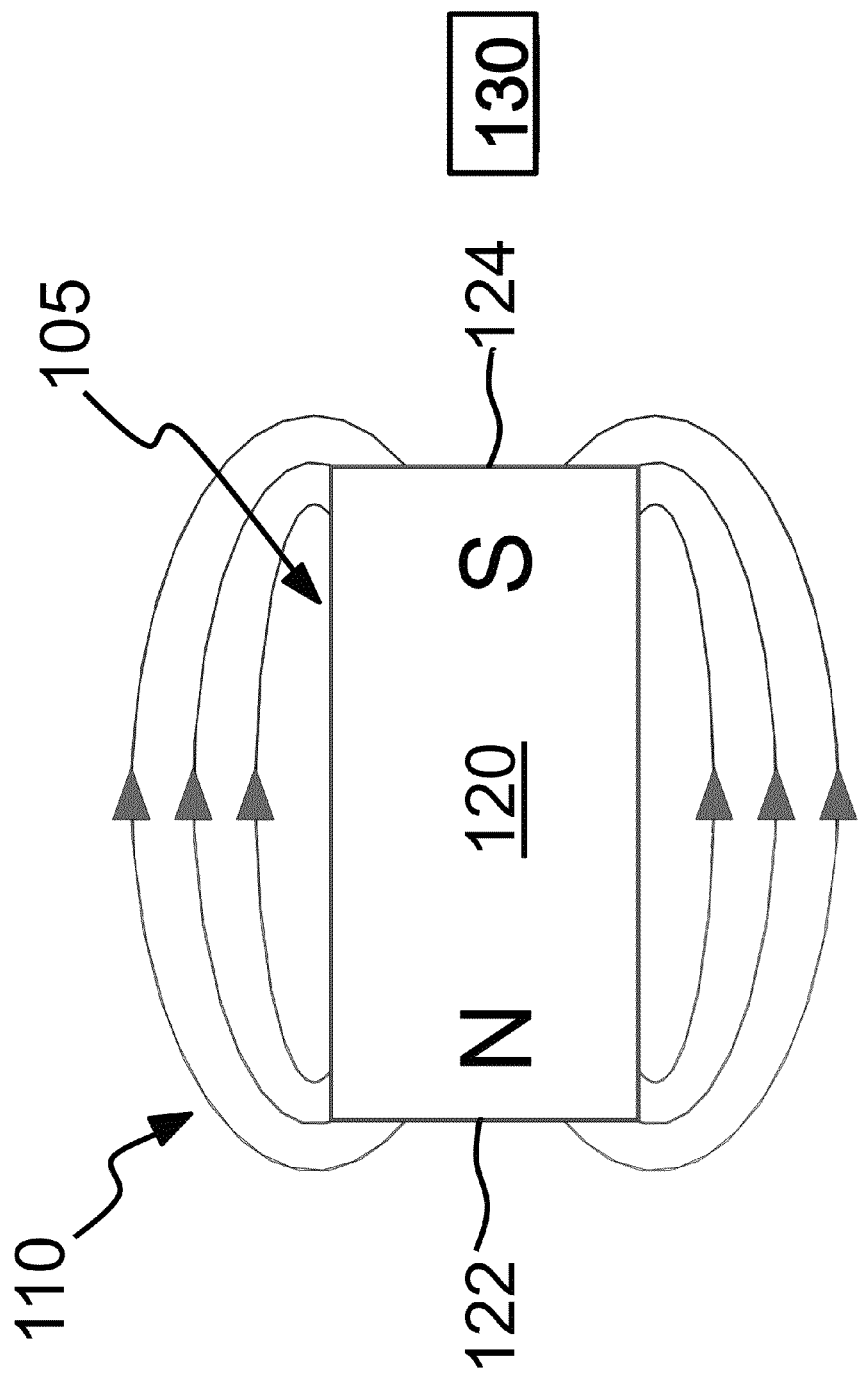
FIG. 1 is a schematic view of an embodiment of a magnetic source and a magnetic member interacting with each other.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Throughout the disclosure, like features among the various illustrated embodiments are designated with like reference numerals, with the leading digits incremented accordingly. Any suitable combination of the features and variations of the same described with respect to one embodiment can be employed with another embodiment. Moreover, any variations discussed with respect to one feature can be employed with a similarly numbered feature, as appropriate.

Disclosed herein are embodiments of devices, systems, and methods for converting magnetic energy into one or more other forms of energy, or stated otherwise, for deriving power in a desired format from magnetic energy. In certain embodiments, energy provided by a magnetic field of a magnetic source is converted into rotational energy of one or more components of a system. The system can include a component that magnetically interacts with a rotational component (e.g., a disk) so as to instigate and/or maintain rotation of the rotational component. The magnetically interactive component can be decoupled from the rotational component due at least in part to an imbalance of torque provided to the rotational component by another magnetically interactive component and/or due to rotational inertia of the rotational component. For example, in some embodiments, a permanent magnet may be coupled with a disk at an outer portion thereof (e.g., an outer edge) and can effect movement of the disk as the magnet is drawn toward a center of the disk via a magnetic field, and the magnet may be decoupled from the disk near a central portion of the disk as another permanent magnet is coupled with the disk at an outer portion thereof. This process may be repeated so as to maintain rotation of the disk. In further embodiments, rotational energy within the system can be converted into one or more other forms of energy, such as electrical energy.

The term "couple" and any derivatives thereof refer to any form of appreciable or significant interaction between two or more entities. Two components may be coupled to each other even if they are not brought into direct contact with each other. Decoupling of the components can involve reorienting or reconfiguring the components such that they no longer interact with each other, or such that their interaction is no longer significant or appreciable. For example, in the case of a magnetic interaction, decoupling of components can be effected by orienting components such that the magnetic influence between the components is negligibly small or nonexistent.

FIG. 1 illustrates an embodiment of a magnetic source 105 that provides a magnetic field 110. The term "magnetic source" is used herein in its ordinary sense, and includes any suitable object or system that provides a magnetic field, such as, for example a permanent magnet, an electromagnet, or any other suitable magnetic device. In the illustrated embodiment, the magnetic source 105 comprises a permanent magnet 120 having a north pole 122 and a south pole 124. The term "permanent magnet" is used herein in its ordinary sense, and includes any suitable material that provides a magnetic field in the absence of application of a magnetic field thereto, or stated otherwise, that independently or intrinsically provides a magnetic field. However, the term does not necessarily imply that the material has always provided a magnetic field or will always provide a magnetic field, since, for example, the material may have been magnetized at some prior time or may be demagnetized at some later time (e.g., by heating the material past its Curie temperature or via some form of degradation). In some embodiments, the permanent magnet 120 comprises a ferromagnetic material. In various embodiments, the permanent magnet 120 comprises a ceramic magnet, an alnico magnet, a samarium cobalt magnet, a neodymium iron born magnet, a ticonal magnet, or a rare earth magnet; may formed in any suitable manner (e.g., die cast or injection molded); and may be rigid or flexible.

The magnetic source 105 thus can be a source of magnetic energy, or stated otherwise, can provide a magnetic potential capable of performing work. For example, the magnetic source 105 can cause a magnetic member 130, which may also be referred to as a magnetically interactive member, to move via the magnetic field 110. The terms "magnetic member" and "magnetically interactive member" include within their scope both magnetic sources and magnetically influenced materials, or stated otherwise, can include any suitable material that reacts to a magnetic field and/or gives rise to a magnetic field of its own. Thus, a "magnetic member" or "magnetically interactive member" can comprise one or more magnetically interactive materials, or stated otherwise, can comprise one or more magnetic sources and/or one or more magnetically influenced materials. The term "magnetically influenced material" includes materials that are capable of magnetization but are not magnetized (e.g., do not independently produce a magnetic field), or that are otherwise capable of being influenced by a magnetic field. For example, magnetically influenced materials can include ferromagnetic and/or ferrimagnetic materials.

One or more magnetic sources 105 can be arranged so as to interact with a magnetic member 130. In particular, the magnetic field 110 of the magnetic source 105 tends to attract or pull the magnetic member 130 closer to the magnetic source 105. As is commonly known, the amount of work performed by the magnetic field 110 on the magnetic member 130 is equal to the force exerted by the magnetic field 110 multiplied by the distance the magnetic member 130 is moved by that force. Also well known is the fact that the magnetic field 110 generally increases in strength with increasing proximity to the magnetic source 105.

With reference to FIG. 2, as is commonly known, an external force F can cause a magnetic source 105 that is repulsed by another magnetic source 105 to move from an original separated position to a position in which the magnetic sources 105 are closer to each other. If the external force F is removed, the repulsion force provided by the magnetic fields of the magnetic sources 105 will move the magnetic sources 105 back to the original separated position, in the absence of friction. Accordingly, the work performed by the magnetic fields of the magnetic sources 105 when the magnetic sources 105 are brought closer to each other is equal to the work performed by the magnetic fields of the magnetic sources 105 in moving the magnetic sources 105 apart. Stated otherwise, the magnetic fields provided by the magnetic sources 105 provide conservative forces. On the other hand, the external force F is non-conservative. Similar principles apply where the external force F is used to separate magnetic sources 105 that are positioned so as to be attracted one another. Moreover, it is noted that when a magnetic source interacts with a magnetically influenced material (e.g., iron), the magnetically influenced material can become partially magnetized. As the magnetically influenced material is thus transitioned to a magnetized structure, internal (e.g., molecular) friction can arise within the material and result in heating. The heat is a form of waste energy that is typically referred to as hysteresis loss.

In certain embodiments, the magnetic source 105 can provide a magnetic field 110 having a strength that varies non-linearly with increasing distance from the magnetic source 105. For example, a permanent magnet 120 can provide a magnetic field 110 that follows an inverse square rule. As a non-limiting illustration, assume that the attraction force of two magnetic sources 105 that are 2 millimeters apart is 10 newtons, then the force of the same two magnetic sources would be only 2.5 newtons when they are 4 millimeters apart. The equation for the force provided by either of the illustrative magnetic sources 105 can follow the equation:

$$\text{Force} = C * 1/(X)^2$$

where C is a constant property of the magnetic source (in this case, C has a value of 40 newton·mm$^2$), and X is the distance between magnetic sources 105. While the above equation may be only approximate, it demonstrates an example of a non-linear interaction of forces between magnets.

Figure 3:
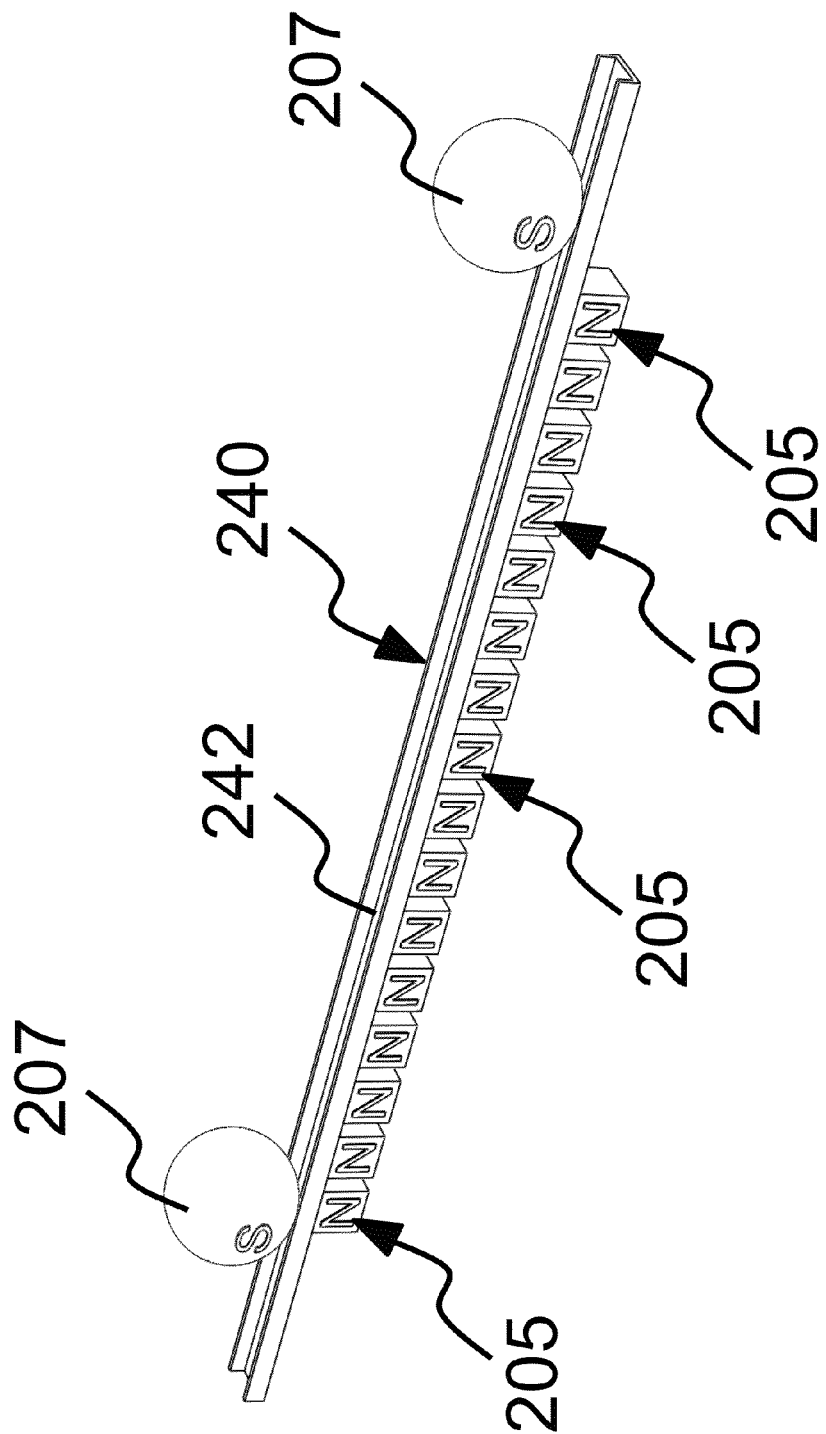
FIG. 3 is a perspective view of an embodiment of a magnetic path and a magnetic member that can interact therewith.
Figure 4:
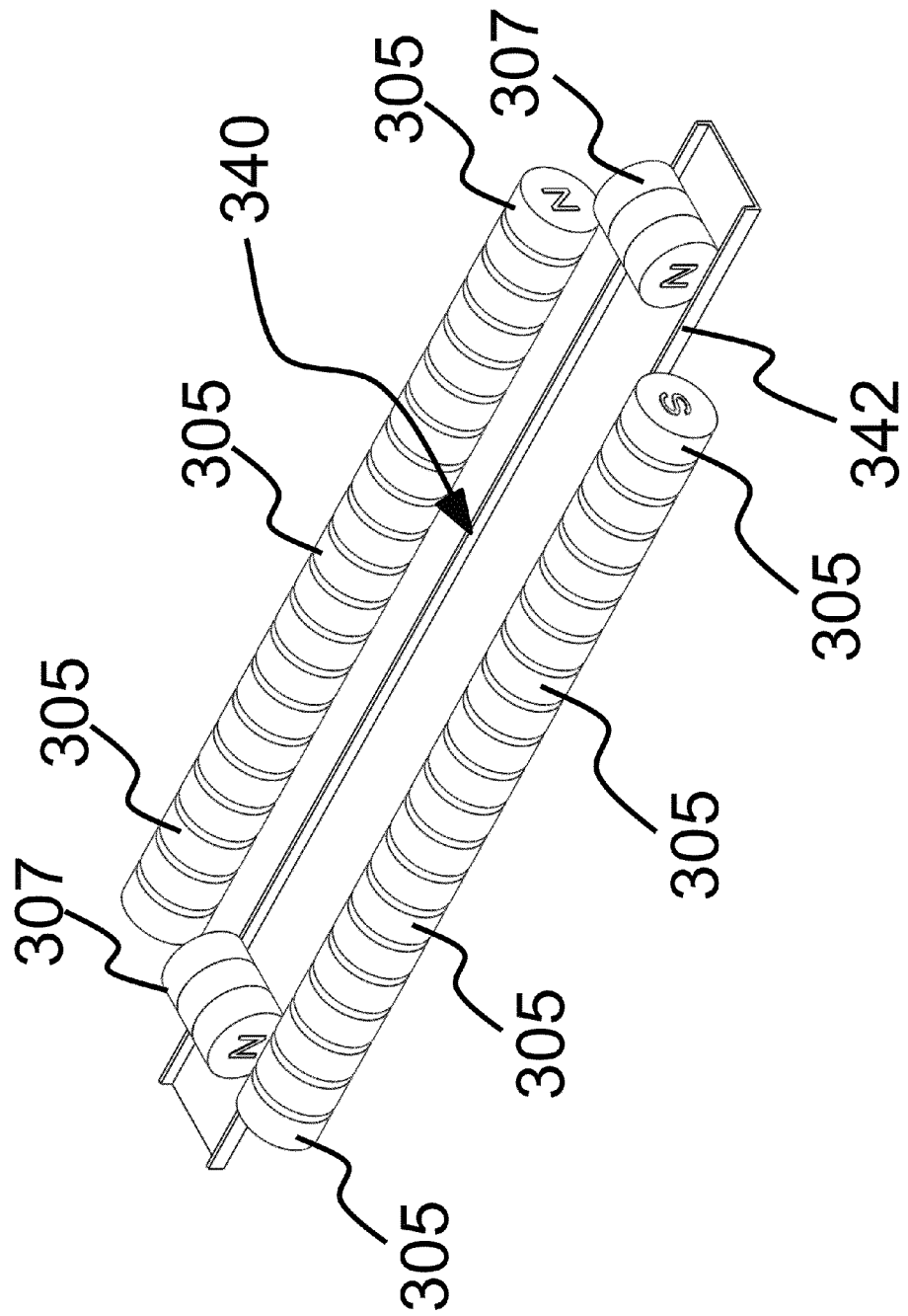
FIG. 4 is a perspective view of another embodiment of a magnetic path and a magnetic member that can interact therewith.
Figure 5:
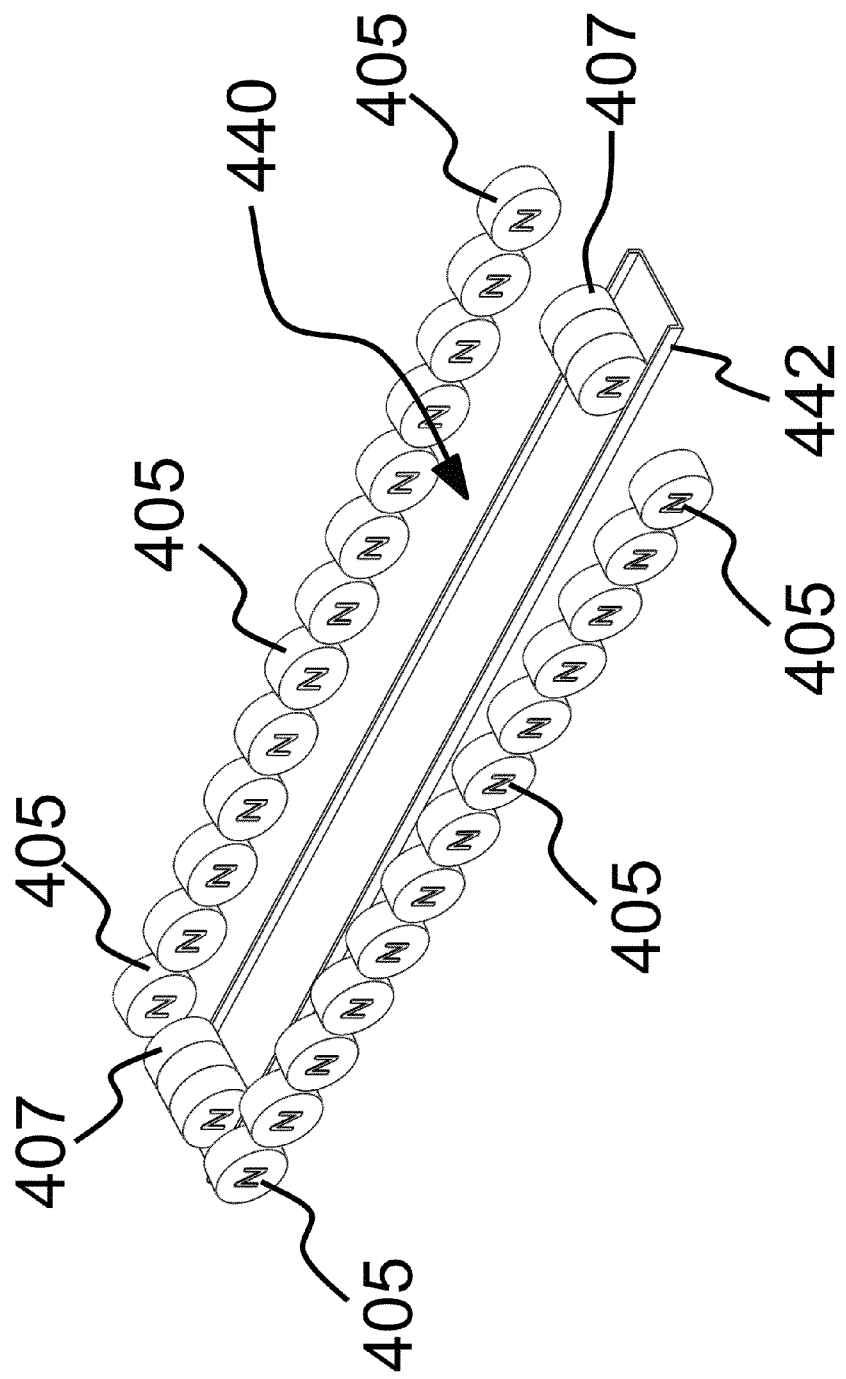
FIG. 5 is a perspective view of another embodiment of a magnetic path and a magnetic member that can interact therewith.

With reference to FIGS. 3-5, a plurality of magnetic sources can be arranged in a variety of configurations to effect linear movement of a magnetically interactive member. As shown in FIG. 3, a magnetic path 240 can include a plurality of magnetic sources 205 arranged such that the pole axes of the magnetic sources 205 are parallel with each other. The magnetic sources 205 can be spaced from each other such that there are gaps between the magnetic sources 205. Magnetic flux about the magnetic sources 205 can create an attractive force on a magnetic member 207, which, in the illustrated embodiment, is a spherical magnetic source having a polar axis that is anti-parallel to the polar axes of the magnetic sources 205. In FIG. 3, the magnetic member 207 is shown in each of two separate resting positions.

The magnetic path 240 can further include a track 242 that is positioned above the magnetic sources 205. In the illustrated embodiment, the track 242 includes parallel sidewalls that are joined by a base wall, and the base wall rests atop the magnetic sources 205. The magnetic member 207 can readily roll along the upper edge of the sidewalls of the track 242. In some embodiments, the track 242 comprises a magnetically influenced material, which may affect the manner in which the magnetic fields of the magnetic sources 205 interact with the magnetic member 207.

The magnetic member 207 can be slowly advanced along the track 242 by an external force toward the magnetic sources 205. At some point, the attractive force provided by the magnetic sources 205 is sufficient to independently effect movement of the magnetic member 207. This position is referred to as the starting position of the magnetic member 207 (e.g., the rightmost position of the magnetic member 207 shown in FIG. 3). The magnetic member 207 can be pulled from the starting position along the track 242 by the magnetic sources 205 until it reaches a stopping position on the track 242 (e.g., the leftmost position of the magnetic member 207 shown in FIG. 3). The position at which the magnetic member 207 stops can depend on the strength and arrangement of the magnetic sources 205. In some cases, after having reached the stopping position, the magnetic member 207 can recoil and be pulled back along the track 242 toward the starting position.

In certain embodiments, due to symmetries in the arrangement of the magnetic sources 205, the energy provided by the magnetic sources 205 to create the motion of the magnetic member 207 is equal to the energy required to push the magnetic member 207 through the stopping point and out of the influence of the magnetic sources 205 via an external force. The principles of the conservation of energy of course bear on the interactions of the magnetic sources 205 with the magnetic member 207.

As shown in FIG. 4, a magnetic path 340 can include magnetic sources 305 arranged so as to create linear motion of a magnetic member 307. In the illustrated embodiment, the magnetic member 307 comprises a permanent magnet, and the magnetic sources 305 comprise permanent magnets that are in linear arrangements on either side of a track 342. The pole axes of magnetic sources 305 on one side of the track 342 are anti-parallel to the pole axes of magnetic sources 305 on the other side of the track 342. The magnetic member 307 comprises three cylindrical permanent magnets, which have pole axes that are perpendicular to the pole axes of the magnetic sources 305. The magnetic member 307 is shown in two separate resting positions.

The magnetic member 307 is pulled along the track 342 from the position shown at the right, and stops at the position shown at the left. A minimum distance between the magnetic member 307 and the magnetic sources 305 can be constant as the magnetic member 307 travels between the starting and stopping positions.

FIG. 5 shows another example of a magnetic path 440 that includes magnetic sources 405 arranged so as to create linear motion of a magnetic member 407. Two rows of magnetic sources 405 line either side of a track 442. Within each row, the magnetic sources 405 are arranged such that their pole axes are parallel or approximately parallel with each other. However, the two rows are angled relative to each other such so as to be closer to each other at one end of the track 442 than they are at the other end. The magnetic member 407 is oriented such that its pole axis is perpendicular to the direction of travel of the magnetic member 407 and approximately perpendicular to the polar axes of the magnetic source 405. The magnetic member 407 is shown in two separate positions.

In the illustrated embodiment, the starting position of the magnetic member 407 is shown at the bottom right end of the track 442, and the stopping position is shown at the top left end of the track 442. Each of the magnetic sources 405 can be identical to the others such that the strength of the magnetic field provided by the magnetic sources 405 increases from the starting position to the stopping position. Accordingly, the magnetic source 405 can influence the magnetic member 407 to move from a rest at the starting position, roll along the track 442 in the direction of increasing field strength, and stop at the stopping position.

The arrangements in FIGS. 3-5 are primarily illustrative. A variety of alterations may be made that can affect the interaction of the magnetic sources 205, 305, 405 and the magnetic members 207, 307, 407. For example, in some embodiments, magnets of varying strengths may be used for the magnetic sources 205, 305, 405 so as to affect (1) how quickly a magnetic member 207, 307, 407 moves along a magnetic path, (2) whether the magnetic member 207, 307, 407 rebounds or comes to a complete stop at the end of the magnetic path, and/or (3) the strength of the field at the stopping position that may be overcome to remove the magnetic member 207, 307, 407 from the influence of the magnetic sources 205, 305, 405 at the stopping position.

Moreover, although only magnetic sources are shown as magnetically interacting with each other in the examples shown in FIGS. 3-5, it is possible to replace one or more magnetic sources with magnetically influenced materials. For example, in the systems shown in FIGS. 3-5, the magnetic members 207, 307, 407 could comprise a magnetically influenced material (e.g., non-magnetized iron) having the same geometrical configuration (i.e., spherical or cylindrical) in the place of a permanent magnet. Similarly, in arrangements such as those shown in FIG. 5, it is possible to instead replace the magnetic sources 405 with magnetically influenced materials. As described hereafter, the foregoing principles can be used to create non-linear (e.g., curved) magnetic paths over which magnetic interaction can take place between any suitable combination of magnetically interactive materials, which can result in rotational movement of a system component.

Figure 6:
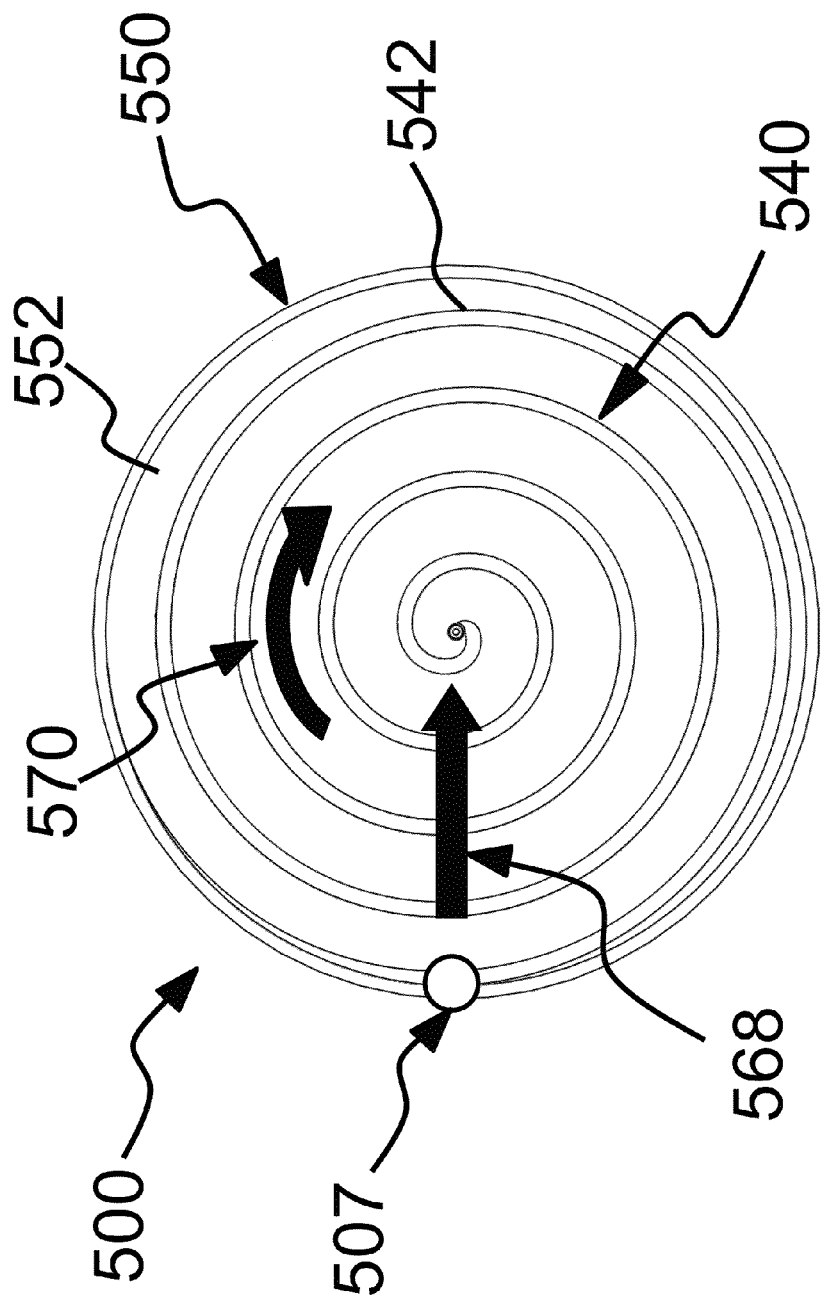
FIG. 6 is a top plan view of an embodiment of a system configured to convert magnetic energy into rotational energy.

FIG. 6 illustrates an embodiment of a system 500 configured to convert magnetic energy into rotational energy. The system 500 includes a rotational member 550 coupled with a magnetic member 507. In the illustrated embodiment, the rotational member 550 comprises a planar disk 552 that includes a magnetic path 540 having a spiral configuration. The magnetic path 540 can be similar to any of the magnetic paths 240, 340, 440 described above, and can comprise any suitable magnetically interactive material. For example, in the illustrated embodiment, the magnetic path 540 comprises a track 542 that comprises a magnetically influenced material and that rests atop a line of magnetic sources (not shown) in an arrangement similar to that of the track 242 and the magnetic sources 205 (see FIG. 3), save that the magnetic path 540 is spiraled rather than linear. In other embodiments, the magnetic path 540 includes a spiral track 542 that is bordered on either side by a spiraled line of magnetic sources (e.g., permanent magnets or electromagnets)—in certain of such embodiments, the magnetic sources are equally spaced from the track 542 along the full length thereof (similar to the magnetic path 340), whereas in other embodiments, the magnetic sources are at varied distances from the track 542, and may, for example, be at a large distance from the track 542 at the outer perimeter of the disk 552 and gradually draw closer to the track 542 so as to be relatively close or adjacent thereto at a more central region of the disk 552 (similar to the magnetic path 440). In some embodiments, the track 542 can be omitted from the magnetic path 540 such that the magnetic path 540 comprises only an arrangement of magnetic sources along which or near which the magnetic member 507 can roll.

The magnetic member 507 can resemble any of the magnetic members 207, 307, 407 described above, and thus can magnetically interact with the magnetic path 540 in any suitable manner. In the illustrated embodiment, the magnetic member 507 comprises a spherical permanent magnet that is constrained to move along a transverse path 568 relative to the disk 552. In the illustrated embodiment, the transverse path 568 defines a straight line that is directed radially inwardly. The constraint provided to the magnetic member 507 may be referred to as a tangential constraint, in that the magnetic member 507 is generally constrained to move in only a radial direction, or stated otherwise, is restrained, inhibited, or prevented from moving in a tangential direction at any point along the transverse path 568. In such an arrangement, interaction between the magnetic member 507 and the magnetic path 540 causes the disk 552 to rotate in a clockwise direction, as indicated by the arrow 570, as the magnetic member 507 moves from the outer edge of the disk 552 toward the center thereof along the track 542.

As is commonly known, the magnitude of a torque is equal to the product of the magnitude of a force and its moment arm. If the strength of the magnetic interaction between the magnetic member 507 and the magnetic path 540 is roughly the same at any point along the transverse path 568, then the amount of torque provided to the disk 552 by the interaction between the magnetic member 507 and the magnetic path 540 decreases as the magnetic member 507 moves from the outer edge of the disk 552 towards its center. Stated otherwise, under such conditions, the positive rotational torque provided by the interaction between a magnetic member 507 and the magnetic path 540 is greater at the outer regions of the disk 552 than is the negative rotational torque provided by the interaction between another magnetic member 507 and the magnetic path 540 at the inner regions of the disk 552. Stated in yet another way, the leverage provided by magnetic members 507 relative to the disk 552 is greater at the outer regions of the disk 552, as compared with the inner regions thereof.

In some embodiments, the strength of the magnetic interaction between the magnetic member 507 and the magnetic path 540 can vary along the length of the magnetic path 540. For example, the interaction can be weaker at an outer region of the disk 552 and can strengthen toward the center of the disk 552. Such an arrangement can give rise to a potential that tends to draw the magnetic member 507 from the outer edge of the disk 552 toward the center of the disk 552. Although a strength of the interaction between the magnetic member 507 and the magnetic path 540 can be greater in the inner regions of the disk 552, a positive torque that results from the relatively weaker interaction between the magnetic member 507 and the path 540 at the outer region of the disk 552 may nevertheless exceed a negative torque that results from the relatively stronger interaction between the magnetic member 507 and the path 540 at a more central region of the disk 552, due to the principles of leverage previously discussed. For example, if the moment arm of the torque provided by the magnetic member 507 at the central region of the disk 552 has a value that is very small (e.g., zero or near zero), then the negative rotational torque will likewise be very small. A sum of the torques of the inner and outer magnetic member 507 can thus be positive, resulting in continued rotation of the disk in a positive direction. Accordingly, even in certain arrangements where the magnetic member 507 is subject to a large potential that tends to strongly draw the magnetic member 507 toward a central portion of the path 540, the magnetic member 507 can nevertheless be decoupled from the path 540 when it reaches the central portion due to magnetic interaction between another magnetic member 507 and the path 540 at an outer portion of the path 540 (e.g., as the additional magnetic member 507 is being coupled with the path 540). An increasing strength of the interaction between the magnetic member 507 and the magnetic path 540 can be accomplished, for example, via the use of sequentially stronger magnetic sources along the magnetic path 540 in an outer-to-inner direction and/or by decreasing the distance between the magnetic member 507 and magnetic sources along the magnetic path 540.

Figure 7:
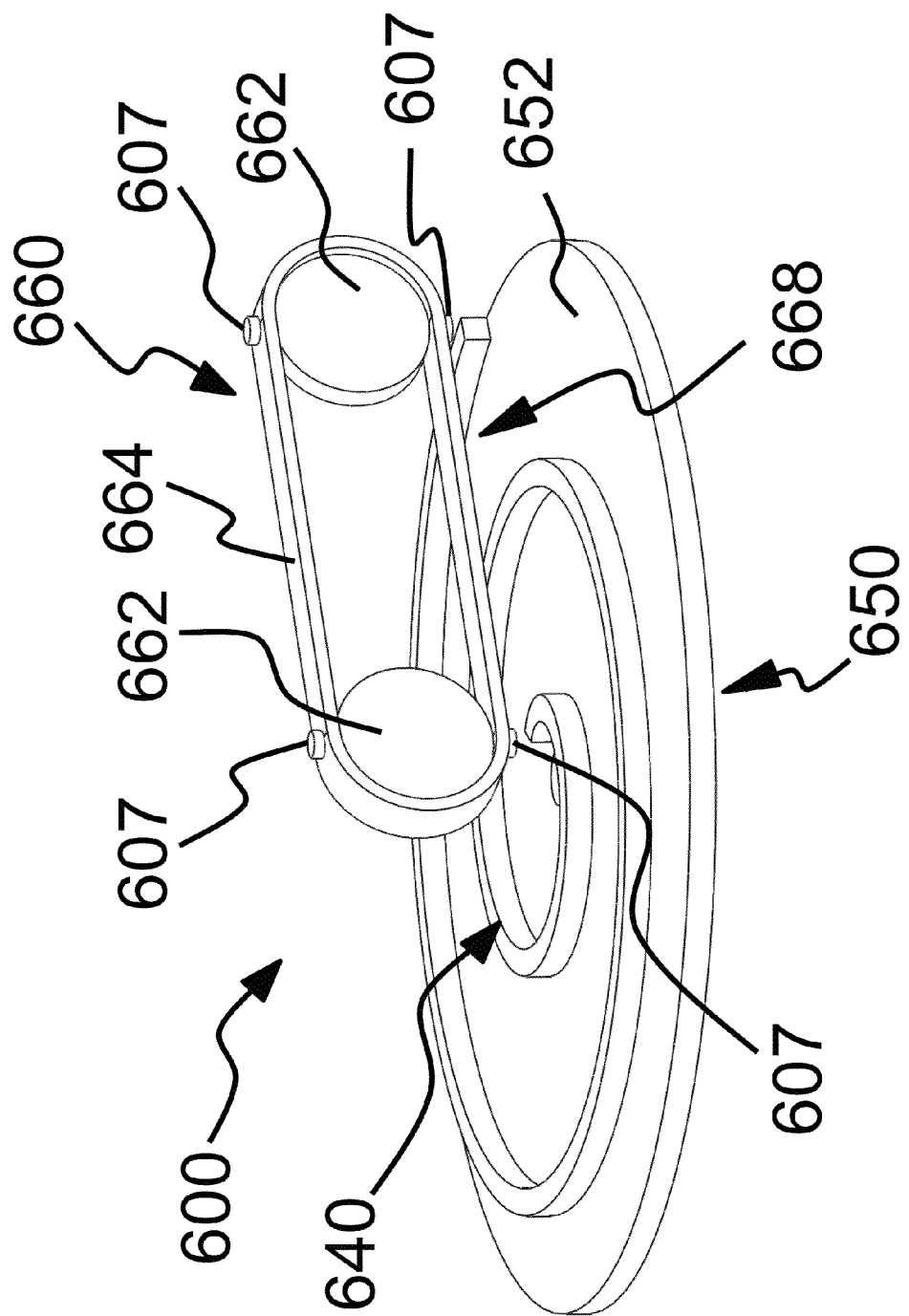
FIG. 7 is a perspective view of an embodiment of a system configured to continuously convert magnetic energy into rotational energy.

FIG. 7 illustrates an embodiment of a system 600 that is configured to continuously convert magnetic energy into rotational energy. The system 600 includes a rotational member 650 and a transverse assembly 660, which may also be referred to as a coupling/decoupling assembly, a constraint assembly, a restraining assembly, or a redirection assembly. The rotational member 650 can resemble the rotational member 550 described above. In the illustrated embodiment, the rotational member 650 includes a substantially planar disk 652 having a magnetic path 640, which projects upwardly from a surface of the disk 652. In other embodiments, the magnetic path 640 may be flush with or recessed relative to a surface of the disk 652. The magnetic path 640 can include any suitable magnetically interactive material (e.g., one or more magnetic sources and/or one or more magnetically influenced materials).

The transverse assembly 660 includes a plurality of magnetic members 607, each of which is connected to a belt 664, or carrying member, that is coupled with wheels 662. In the illustrated embodiment, the wheels 662 have rotational axes that are substantially perpendicular to a rotational axis of the rotational member 650. Other arrangements are also possible. For example, rotational axes of the wheels 662 may be at an angle other than 90 degrees relative to the rotational axis of the rotational member 650 (e.g., at an angle greater than 0 degrees, but less than about 15, 30, 45, 50, 60, 70, 80, or 90 degrees). The transverse assembly 660 is oriented such that a magnetic member 607 can move along a constrained path 668 from an outer edge of the disk 652 toward a central region of the disk 652 in close proximity to the magnetic path 640. In the illustrated embodiment, the constrained path 668 defines at least a portion of a substantially straight line that intersects an axis of rotation of the disk 652 and is normal to a plane that is tangential to an outer edge of the disk 652. The magnetic members 607 are spaced from (e.g., suspended above) the magnetic path 640 along the length of the magnetic path 640, and thus do not contact the magnetic path 640. As a result, the magnetic path 640 of the illustrated embodiment does not include a track such as those described above.

When the system 600 is in operation, a magnetic member 607 is coupled with the magnetic path 640 at an outer edge thereof. The magnetic interaction between the magnetic member 607 and the magnetic path 640 draws the magnetic member 607 toward the center of the disk 652 and provides rotational energy to the disk 652. The magnetic member 607 is decoupled from the magnetic path 640 at an inner portion thereof. In particular, as the magnetic member 607 nears the end of the magnetic path 640, another magnetic member 607 is coupled with the magnetic path 640 at an outer edge thereof. The magnetic interaction between the newly coupled magnetic member 607 and the magnetic path 640 provides sufficient torque to the disk 652 to overcome the magnetic interaction between the original magnetic member 607 and the inner portion of the magnetic path 640. Moreover, movement of the newly coupled magnetic member 607 along the constrained path 668 advances the belt 664 such that when the magnetic member 607 is at or near the inner end of the path 668, yet another magnetic member 607 is coupled with the magnetic path 640 so as to assist in decoupling the inner magnetic member 607 from the magnetic path 640. The magnetic member 607 that was decoupled from magnetic path 640 at an inner portion thereof remains spaced from the magnetic path 640 so as not to be influenced thereby as it is advanced toward an outer edge of the disk 652. This magnetic member 607 is eventually re-coupled with the magnetic path 640 at an outer portion thereof, and interaction between this re-coupled magnetic member 607 and the magnetic path 640 can assist in decoupling another magnetic member 607 from the magnetic path 640. This process can be repeated until magnetic sources within the system 600 (e.g., permanent magnets within the magnetic path 640 and/or the magnetic members 607) no longer provide sufficient magnetic energy to maintain operation of the system 600.

With continued reference to FIG. 7, a first magnetic member 607 is shown being decoupled from the magnetic path 640 near the center of the disk (thus imparting a negative rotational torque to the disk), a second magnetic member 607 is shown being coupled with the magnetic path 640 (thus imparting a positive rotational torque to the disk), and third and fourth magnetic members 607 are shown being advanced toward an outer edge of the disk 652 in a decoupled state (thus not imparting any appreciable torque to the disk). Although the system 600 is illustrated with four magnetic members 607 (the distances between which along the belt 664 are not necessarily to scale), more or fewer magnetic members 607 are possible. For example, in various embodiments, the transverse assembly 660 comprises one or more, two or more, three or more, four or more, or five or more magnetic members 607. In embodiments in which only one magnetic member 607 is used, the rotational inertia of the wheels 662 may be sufficient to decouple the magnetic member 607 from an inner end of the magnetic path 640 and to move the magnetic member 607 to an outer end of the magnetic path 640 so as to re-couple the magnetic member 607 with the magnetic path 640. Moreover, in certain embodiments having multiple magnetic members 607, the rotational inertia of the 662 and/or the disk 652 can assist with the coupling and/or decoupling of the magnetic members 607 and the magnetic path 640.

Any suitable magnetic interaction between the magnetic member 607 and the magnetic path 640 is contemplated. For example, as can be appreciated from the disclosure herein, in some embodiments, each magnetic member 607 can comprise one or more magnetic sources and the magnetic path 640 can comprise a magnetically influenced material. In other embodiments, each magnetic member 607 can comprise a magnetically influenced material and the magnetic path 640 can comprise one or more magnetic sources. In still other embodiments, one or more of the magnetic members 607 and the magnetic path 640 can each comprise one or more magnetic sources.

In various embodiments, the system 600 may be configured to operate either in an attraction mode or a repulsion mode. For example, in some embodiments, such as that previously described with respect to FIG. 7, the magnetic member 607 and the magnetic path 640 each may comprise one or more magnetic sources that attract each other, where the system 600 operates in an attraction mode. The magnetic attraction may increase between the magnetic member 607 and the magnetic path 640 in a direction toward the axis of rotation of the rotational member 650. Accordingly, the rotational member 650 may spin in a clockwise direction, as viewed from above. However, in other embodiments that operate in a repulsion mode, the magnetic sources of the magnetic member 607 and the magnetic path 640 may be oriented or otherwise arranged such that they repel each other. The strength of the repulsion may decrease in a direction toward an outer perimeter of the rotation member 650. Accordingly, the rotational member 650 may spin in a counterclockwise direction, as viewed from above. In either case, the system 600 may operate suitably due to the fact that the leverage or torque at or near the perimeter of the rotation member 650 is greater than the leverage at or near the central axis of rotation of the rotational member 650. Other systems described herein likewise may operate in an attraction mode and/or a repulsion mode.

In certain embodiments, the transverse assembly 660 can be configured to constrain movement of the magnetic members 607. For example, in some embodiments of the system 600 that are configured for operation in a repulsion mode, the magnetic members 607 may be repelled from the magnetic path 640. Accordingly, the belt 664 may be taut or otherwise configured to prevent movement of the magnetic members 607 from a substantially linear path while the magnetic members 607 interact with the magnetic path 640. In other or further embodiments, one or more constraining structures (not shown), such as one or more guide rails or tracks (e.g., U-shaped tracks with the open end of the U facing downward), which are not shown, may be positioned directly above the portion of the belt 664 along which interaction between the magnetic members 607 and the magnetic path 640 occurs. The constraining structures can prevent the magnetic members 607 from being deflected from a substantially linear path during interaction with the magnetic path 640.

In certain embodiments, the system 600 can be powered solely by the energy provided by the magnetic members 607 and/or the magnetic path 640. For example, the magnetic members 607 can be continuously coupled with the disk 652 at an outer region thereof such that the positive torque provided by each newly coupled magnetic member 607 exceeds a negative torque provided by a magnetic member 607 that is being decoupled from the disk 652 at or near a center thereof. Stated otherwise, the system 600 can operate without an external energy source. For example, in some embodiments, the system 600 can be configured to start from rest without introducing energy into the system. In other embodiments, an initial amount of energy may be introduced into the system 600 initially in order to start the system. For example, energy may be provided to the disk 652 in order to achieve a threshold rotational inertia, and thereafter, the system 600 can proceed without further introduction of energy into the system. At some point, friction or other energy losses (e.g., degradation of the magnetic members) within the system 600 can cause it to slow down or ultimately stop.

In some embodiments, rotational energy of the rotational member 650 can be converted to another form of energy that can be extracted from the system 600 in any suitable manner. For example, a portion of the rotational energy can be extracted from the system in the form of electrical energy via any suitable method (e.g., via any suitable electric generator). Again, it noted that examples provided herein are merely illustrative. Other arrangements are also possible for using the principles of leverage (e.g., unbalanced leverage) to continuously convert magnetic energy into other usable energy forms in a highly efficient manner.

Figure 8:
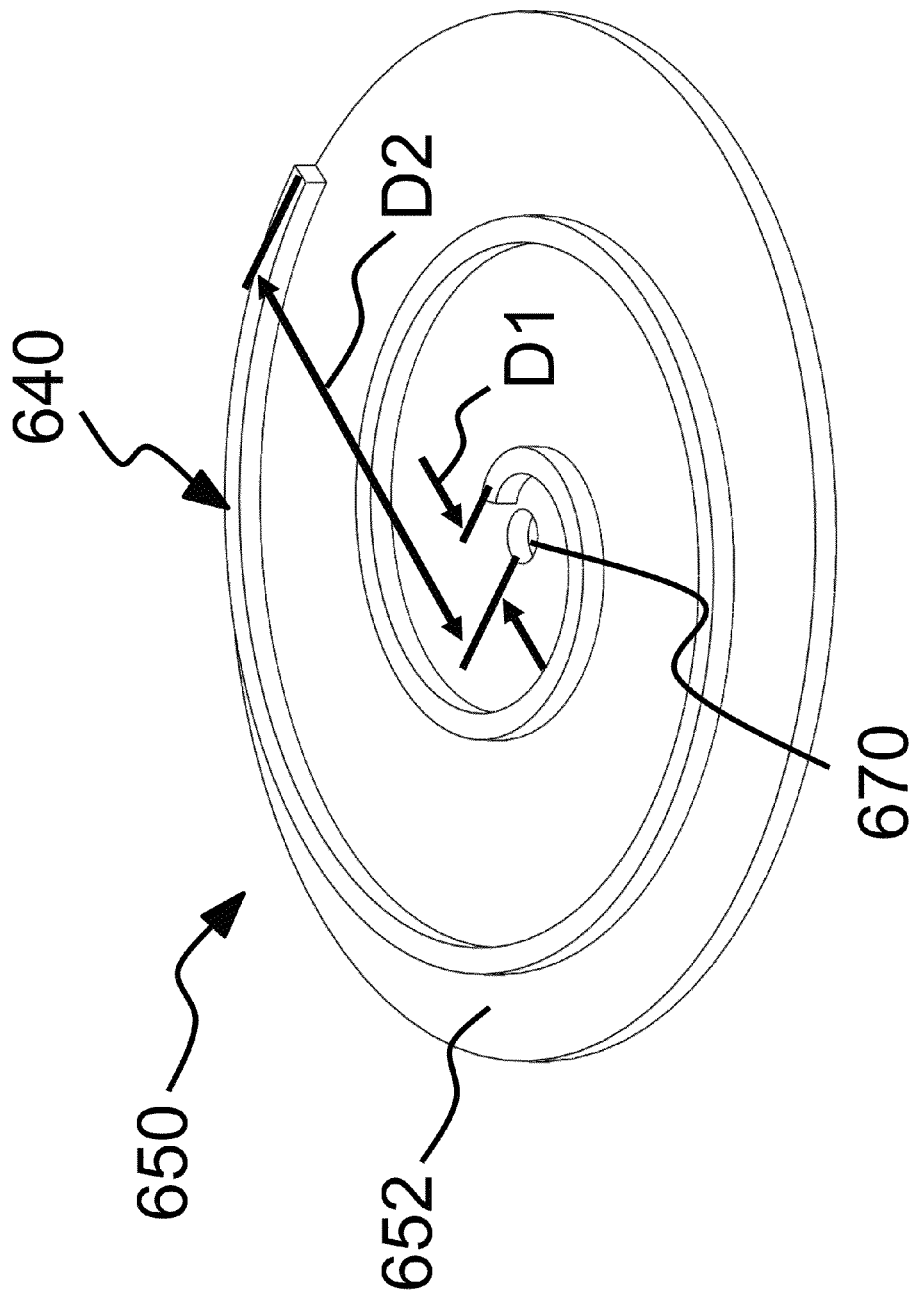
FIG. 8 is a perspective view of an embodiment of a rotational member compatible with the system of FIG. 7.

FIG. 8 illustrates another view of the rotational member 650. In the illustrated embodiment, the magnetic path 640 terminates short of the center 670 of the disk 652. In particular, the magnetic path 640 ends at a distance D1 from the center 670 of the disk 652. The magnetic path 640 begins at a distance D2 from the center 670 of the disk 652. The distance D2 is much greater than the distance D1. Accordingly, in an embodiment in which the magnetic path 640 provides a magnetic field, and in which each of the magnetic members 607 includes a magnetic source that provides a magnetic field equal in strength to that of the other magnetic members 607, the torque that results when a magnetic member 607 is coupled to the outer end of the magnetic path 640 will far exceed an oppositely directed torque that would tend to prevent a magnetic member 607 from being decoupled from the inner end of the magnetic path 640.

Figure 9:
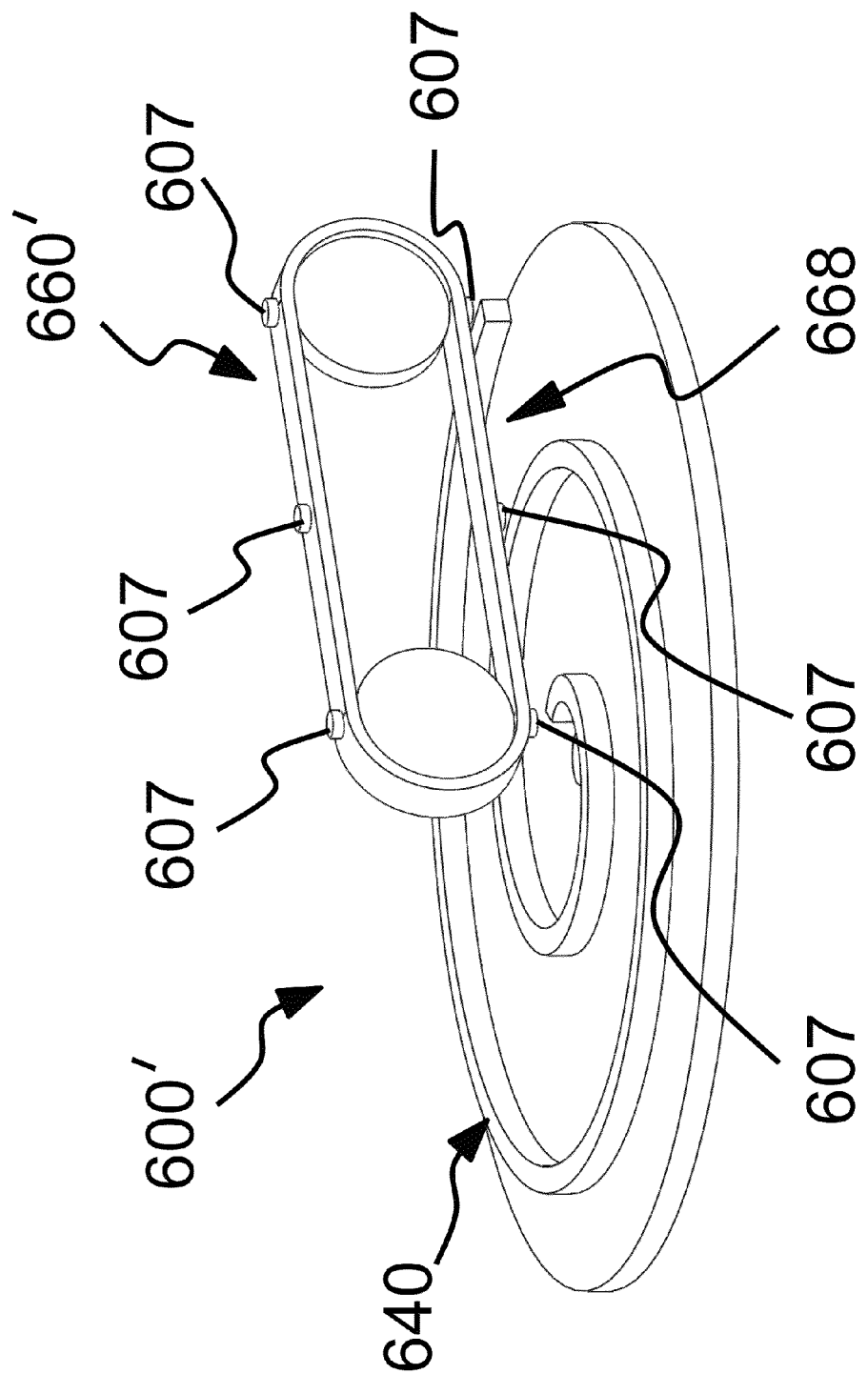
FIG. 9 is a perspective view of another embodiment of a system configured to continuously convert magnetic energy into rotational energy.

FIG. 9 illustrates another embodiment of a rotational system 600' that includes another embodiment of a transverse assembly 660'. The transverse assembly 660' includes additional magnetic members 607. As can be seen from the illustrated stage of operation, when a first magnetic member 607 is decoupled from the magnetic path 640 and a second magnetic member 607 is coupled with the magnetic path 640, a third magnetic member 607 can be in a coupled state relative to the magnetic path 640. The third magnetic member 607 can be positioned at an intermediate region of the magnetic path 640, and may generate rotational movement of the rotational member 650 in a positive direction.

Figure 10:
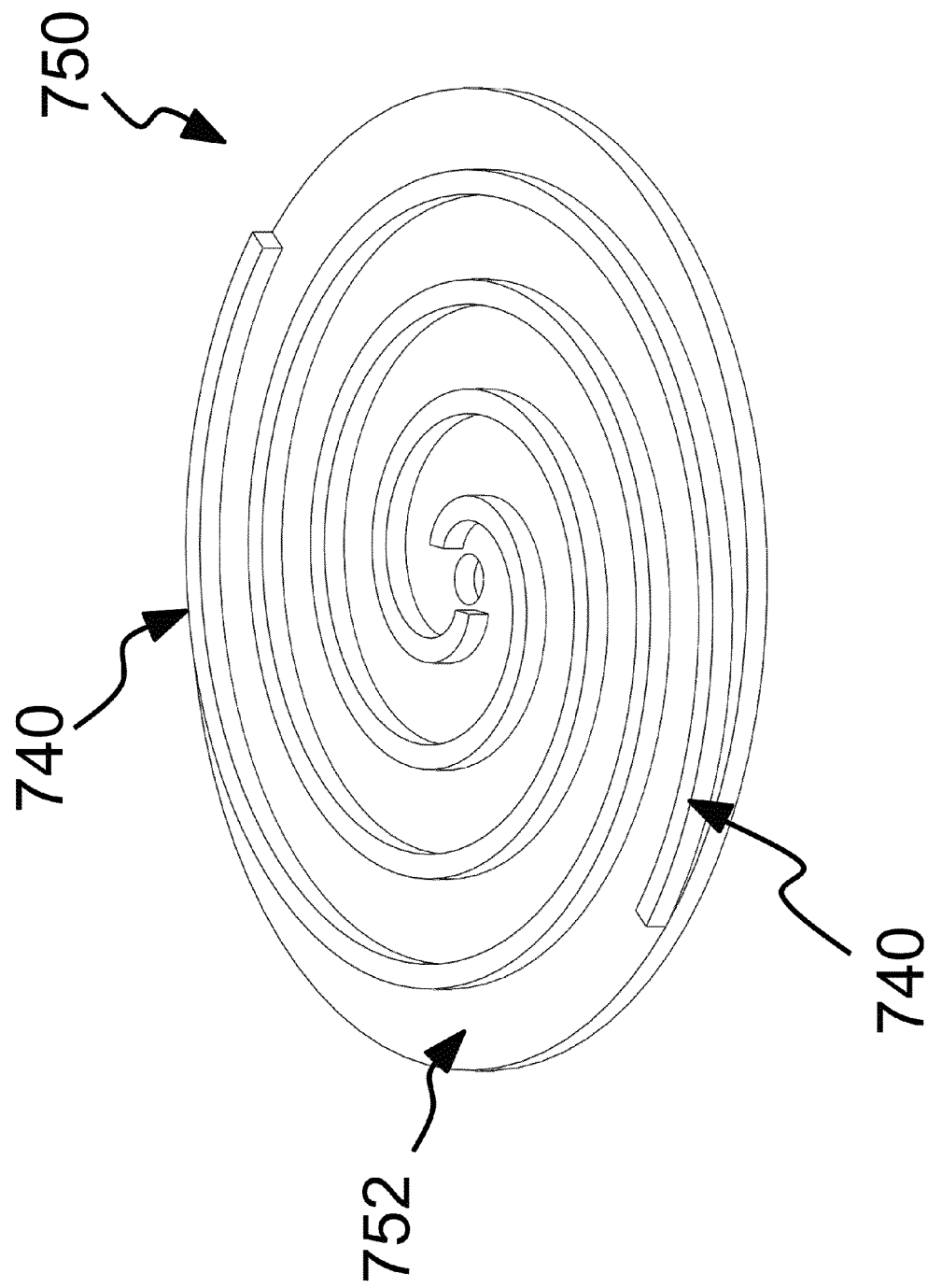
FIG. 10 is a perspective view of an embodiment of a rotational member compatible with embodiments of systems such as those illustrated in FIGS. 7 and 9.

FIG. 10 illustrates another embodiment of a rotational member 750 that can be used with a system, such as the system 600, that includes multiple transverse assemblies 660. The rotational member 750 includes two magnetic paths 740, which begin at opposite sides of an outer edge of a disk 752.

Figure 11:
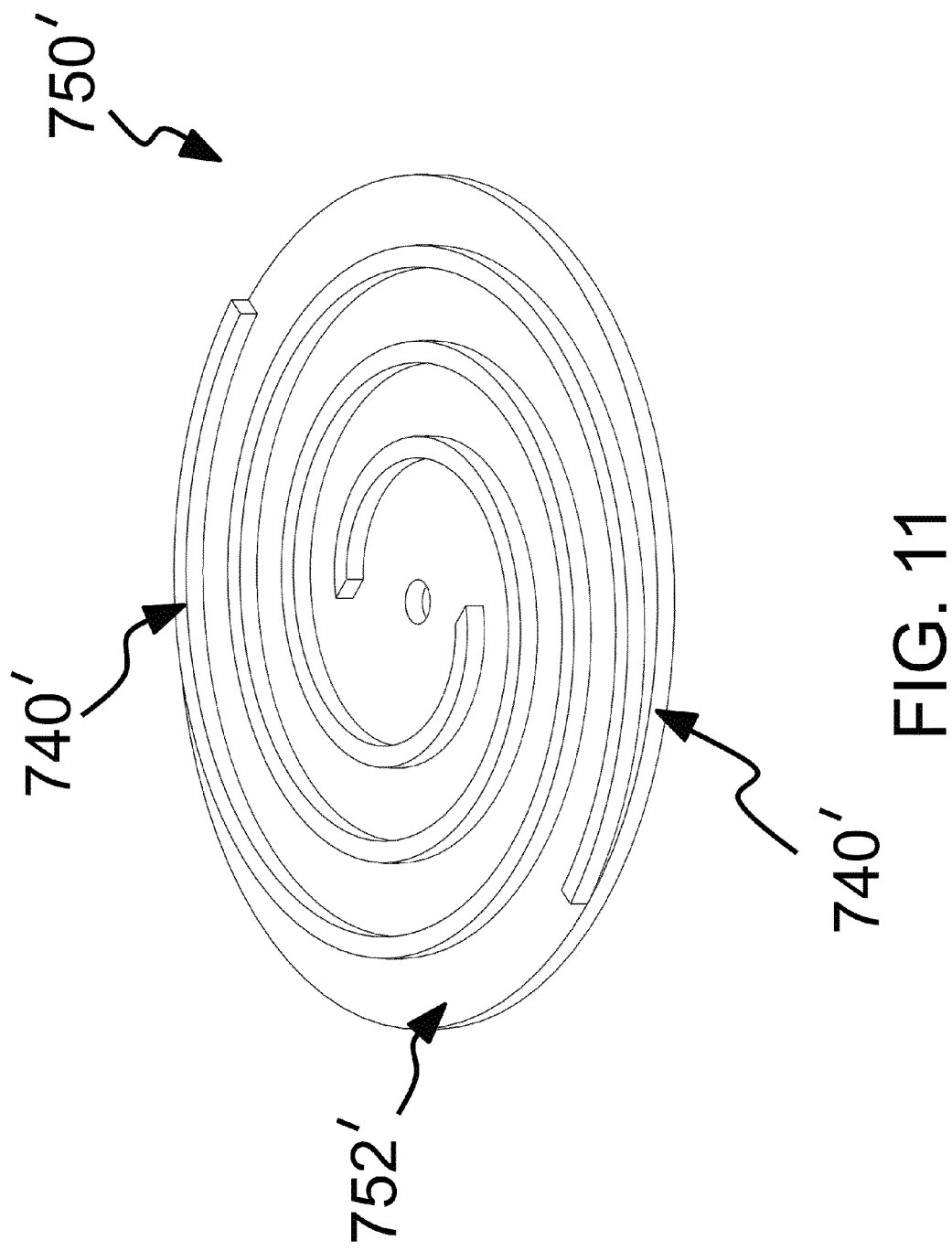
FIG. 11 is a perspective view of another embodiment of a rotational member compatible with embodiments of systems such as those illustrated in FIGS. 7 and 9.

FIG. 11 illustrates another embodiment of a rotational member 750' that resembles the rotational member 750. The rotational member 750' includes two magnetic paths 740' that are shorter than the magnetic paths 740. In particular, the magnetic paths 740' provide additional space at a central portion of a disk 752'. The additional space can facilitate the use of multiple transverse assemblies 660, such as the transverse assembly 600 shown in FIG. 7. For example, the additional space at the center of the rotational member 750' can provide sufficient space for magnetic members 607 of adjacent transverse assemblies 660 to be decoupled from their respective magnetic paths 740 without the decoupled magnetic members 607 interacting with each other. Any suitable number of transverse assemblies 660 may be used. For example, in various embodiments, two, three, four, five, six, seven, or eight or more transverse assemblies 660 may be used with a single disk 752'. In some embodiments, the transverse assemblies 660 may be angularly spaced from each other by equal amounts (e.g., where two transverse assemblies 660 are used, the assemblies may be 180 degrees apart, whereas where three transverse assemblies 660 are used, adjacent assemblies may be 120 degrees apart).

Figure 12:
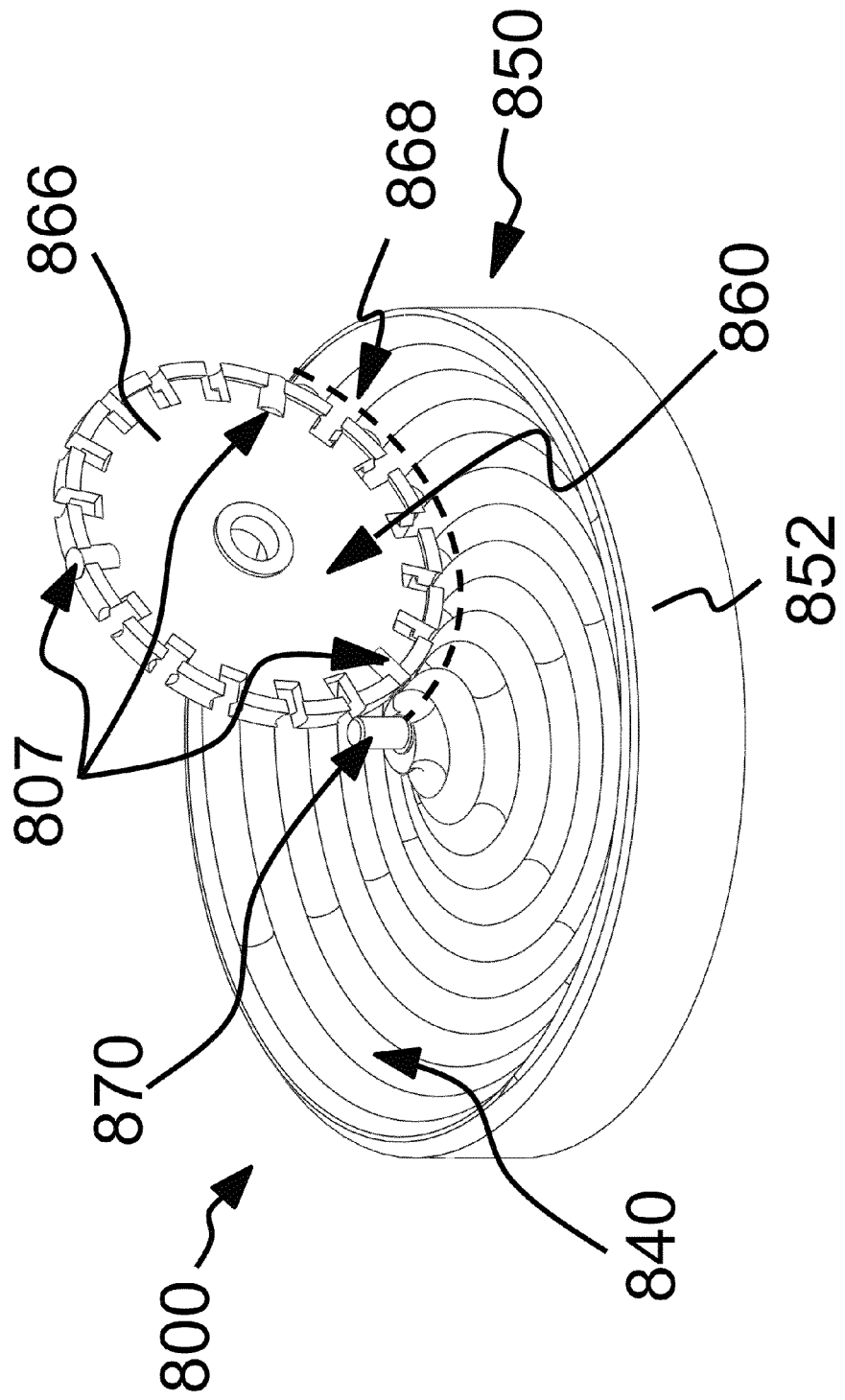
FIG. 12 is a perspective view of another embodiment of a system configured to continuously convert magnetic energy into rotational energy.

FIG. 12 illustrates another embodiment of a system 800 that is configured to continuously convert magnetic energy into rotational energy. As with other embodiments described herein, the rotational energy may be converted to one or more other suitable forms of energy (e.g., electricity). The system 800 includes a rotational member 850 and a transverse assembly 860. The rotational member 850 can resemble the rotational members 550, 650 described above, except that it includes a disk 852 having a concave surface sloping downwardly from its outer edge and a concave conical projection sloping upwardly toward a center of rotation 870 thereof. A magnetic path 840 projects upwardly from the concave surface of the disk 852.

The transverse assembly 860 includes a plurality of magnetic members 807, each of which is connected to a transverse assembly or transverse disk 866 at an outer perimeter thereof. In the illustrated embodiment, the transverse disk 866 has a rotational axis that is substantially perpendicular to a plane that contains a rotational axis of the rotational member 850. The transverse assembly 860 is oriented such that a magnetic member 807 can move along a constrained path 868 from an outer edge of the disk 852 toward a central region of the disk 852 in close proximity to the magnetic path 840. In the illustrated embodiment, a distance between each magnetic member 807 and the magnetic path 840 is constant as the magnetic member 807 moves along the constrained path 868, whereas in other embodiments, the distance may vary along the course of the constrained path 868. In the illustrated embodiment, the constrained path 868 defines a substantially circular arc that lies within a radial plane of the disk 852. The radial plane is aligned with and extends through the disk 866. In the illustrated embodiment, an axis of rotation of the disk 852 also is aligned with and extends through the radial plane. Other arrangements are also possible. For example, a rotational axis of the transverse disk 866 may be at an angle other than 90 degrees relative to the plane that contains the rotational axis of the rotational member 850 (e.g., at an angle greater than 0 degrees, but less than about 15, 30, 45, 50, 60, 70, 80, or 90 degrees).

The magnetic members 807 can be coupled with and decoupled from the magnetic path 840 as the disk 866 is rotated. In the illustrated embodiment, the disk 866 includes three magnetic members 807 that are equally spaced from each other. The coupling of one of the magnetic members 807 with the magnetic path 840 can assist in decoupling another magnetic member 807 from the magnetic path 840 in a manner such as that discussed above. Other embodiments can include more or fewer magnetic members 807. For example, in some embodiments, the transverse assembly 860 includes a single magnetic member 807. Rotational inertia of the disk 866 and/or the disk 852 can be sufficient to overcome the magnetic interaction between the magnetic member 807 and one end region of the magnetic path 840 (e.g., at an inner end or an outer end of the path 840, depending on the operational mode—attraction or repulsion—of the system 800), and further, rotational inertia of the disk 866 can be sufficient to reposition the magnetic member 807 so as to re-couple the magnetic member 807 at an opposite end region of the magnetic path 840 (e.g., at an outer end or an inner end of the path 840, respectively).

Figure 13:
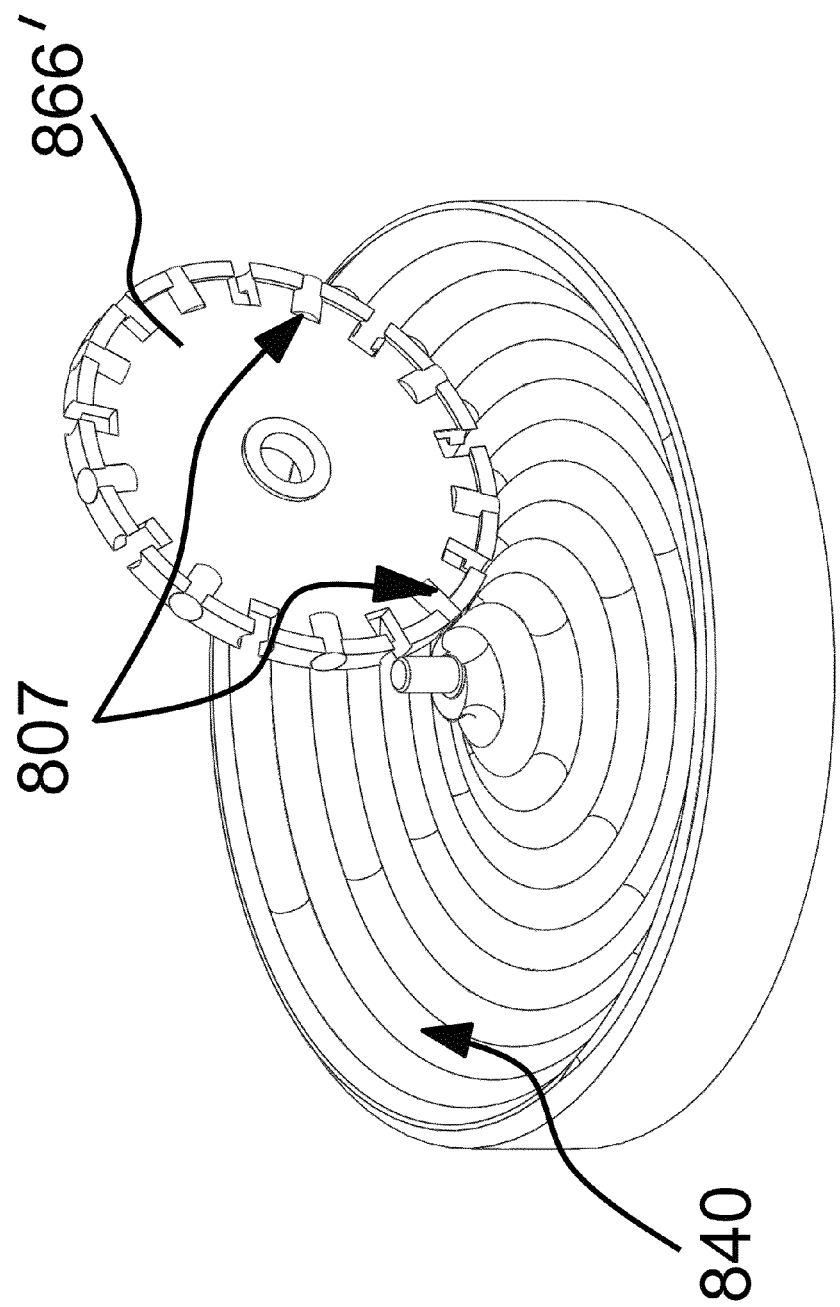
FIG. 13 is a perspective view of another embodiment of a system configured to continuously convert magnetic energy into rotational energy.

For example, FIG. 13 illustrates an embodiment of a disk 866' that includes nine magnetic members 807. When a first magnetic member 807 is decoupled from the magnetic path 840 and a second magnetic member 807 is coupled with the magnetic path 840, additional (e.g., third and fourth) magnetic members 807 remain coupled with the magnetic path 840 at intermediate regions thereof and contribute to rotation of the rotational member 850.

Figure 14:
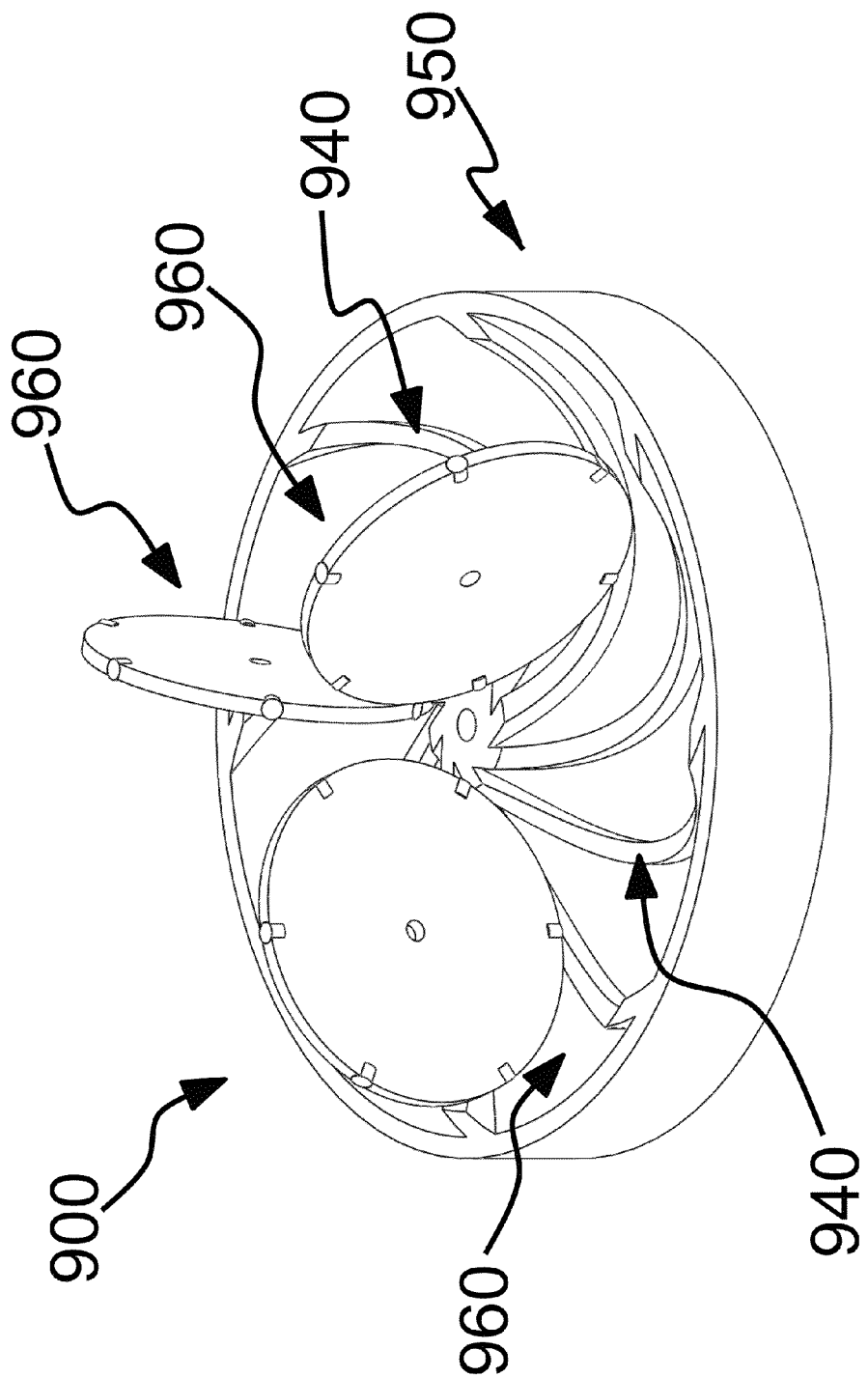
FIG. 14 is a perspective view of another embodiment of a system configured to continuously convert magnetic energy into rotational energy.

FIG. 14 illustrates another embodiment of a system 900 that includes a rotational member 950 and multiple transverse assemblies 960. The rotational member 950 can include multiple magnetic paths 940. In the illustrated embodiment, each of the magnetic paths 940 is less spiraled than the path 840 discussed above (e.g., extends along a smaller angular distance). Additionally, the number of magnetic paths 940 in the system 900 is greater than the number of transverse assemblies 960 in the system. Each transverse assembly 960 can interact with multiple magnetic paths 940.

Figure 15:
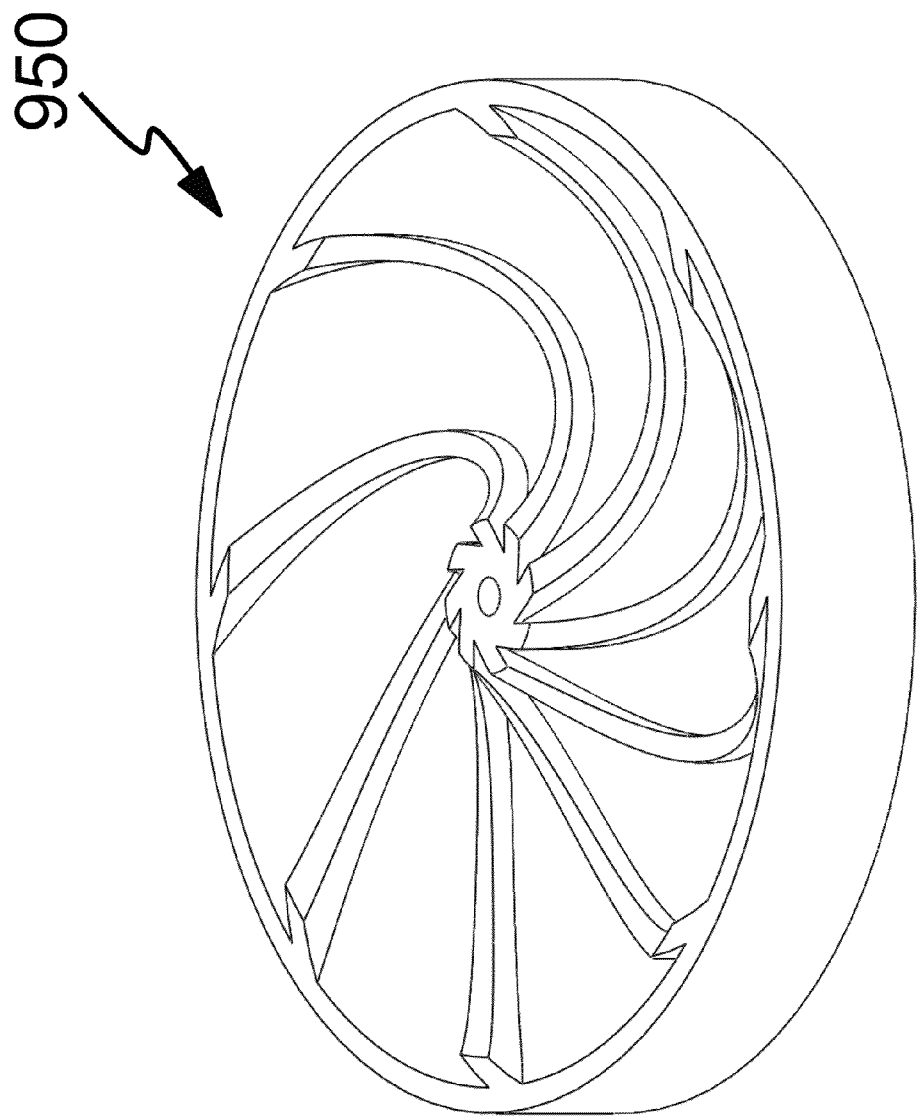
FIG. 15 is a perspective view of an embodiment of a rotational member compatible with the system of FIG. 14.

FIG. 15 illustrates another view of the rotational member 950 that is not obscured by the transverse assemblies 960.

Figure 16:
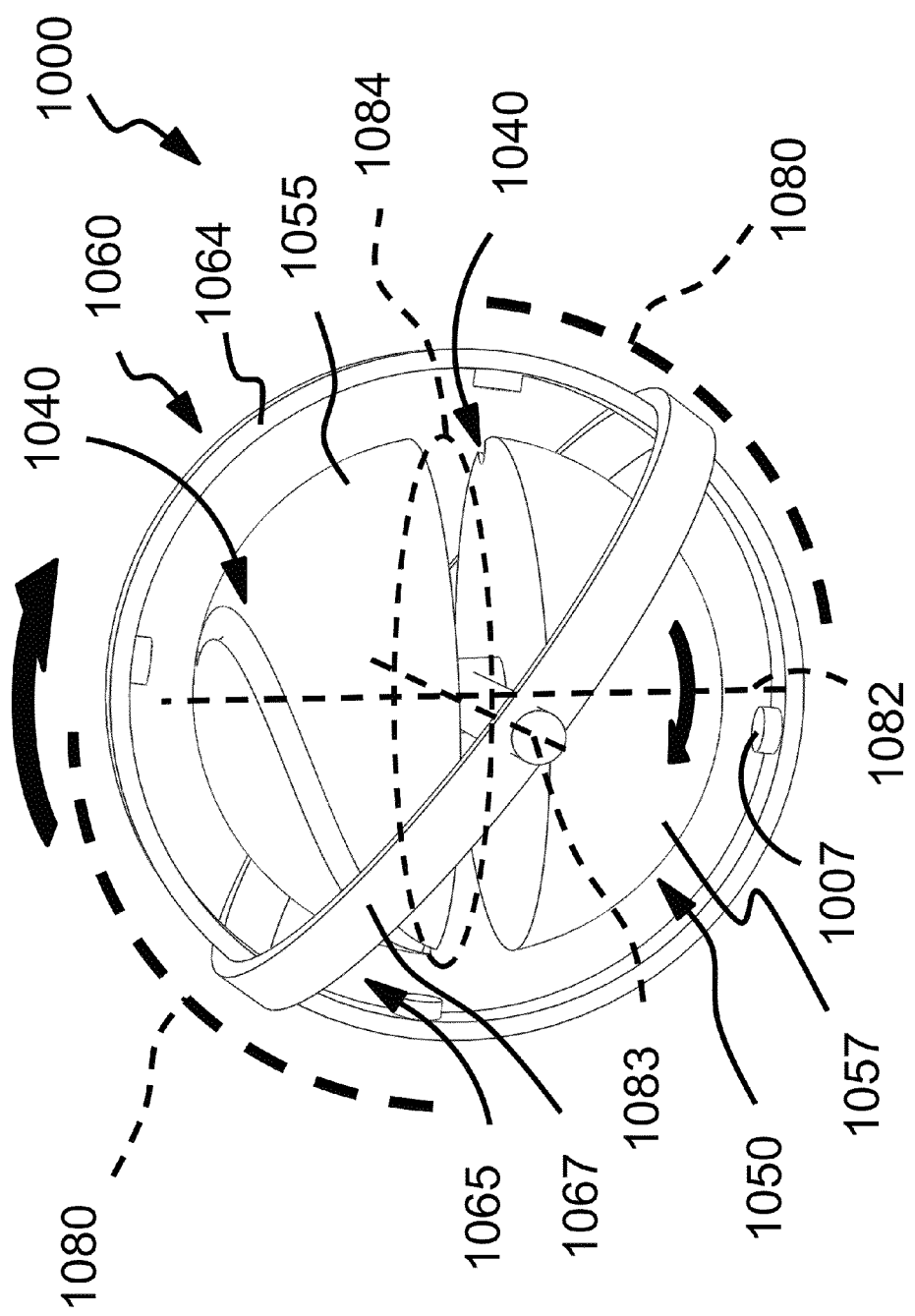
FIG. 16 is a perspective view of another embodiment of a system configured to continuously convert magnetic energy into rotational energy.

FIG. 16 illustrates another embodiment of a system 1000 that can resemble other systems described herein. The system 1000 includes a rotational member 1050 and a coupling/decoupling assembly or transverse assembly 1060. The rotational member 1050 is configured to rotate about a rotational axis 1082, and the transverse assembly 1060 is configured to rotate about a transverse rotational axis 1083. The axes 1082, 1083 can be substantially perpendicular to each other.

The illustrated rotational member 1050 defines a geometry different from those described above. Any suitable geometry is possible. In the illustrated embodiment, the rotational member 1050 comprises un upper hemisphere 1055 and a lower hemisphere 1057. The rotational member 1050 thus may comprise two parts, which may be capable of independent rotation. However, in the illustrated embodiment, the upper and lower hemispheres 1055, 1057 are fixedly secured to each other so as to rotate in unison. The illustrated rotational member 1050 thus may also be described herein as a sphere. The sphere 1050 can include any suitable number of magnetic paths 1040, which can resemble any of the paths described above. In the illustrated embodiment, each of the upper and lower hemispheres 1055, 1057 includes a single magnetic path 1040 that is substantially helical. Each path spirals from an equatorial plane 1084 of the sphere 1050 toward an opposite pole of the sphere 1050 (e.g., a point through which the rotation axis 1082 passes). In the illustrated embodiment, the magnetic paths 1040 define depressions or channels in the hemispheres 1055, 1057, although other suitable arrangements (such as those discussed above, for example) are possible. Only an upper end of the magnetic path 1040 of the lower hemisphere 1057 is shown in FIG. 16, as the remainder of the magnetic path 1040 is obscured from view.

The transverse assembly 1060 includes a plurality of magnetic members 1007 that are mounted to a ring 1064, which may also be referred to as the transverse ring. The transverse ring 1064 is configured to rotate about the axis 1083. Any suitable suspension system 1065 may be used to mount the transverse ring 1064 in a rotatable fashion, and may preferably be configured for low frictional losses due to rotation of the ring 1064. In the illustrated embodiment, the suspension system 1065 includes a further ring 1067 that is fixedly attached to the transverse ring 1064. The rings 1064, 1067 are substantially perpendicular to each other, and the axis 1083 is centered relative to the transverse ring 1064 and passes through the ring 1067. Other suitable arrangements are also possible. As can be appreciated from the foregoing, the transverse ring 1064 can define a path that is followed by the magnetic members 1007. The path can be suspended above a surface of the sphere 1050, and more particularly, above the magnetic paths 1040, such that there is little or no physical contact between the magnetic members 1007 and the paths 1040. Such an arrangement can provide for little or no frictional losses due to contact between the magnetic members 1007 and the paths 1040.

The system 1000 can operate in much the same manner as other systems described above. The system 1000 can include one or more coupling regions 1080 in which the magnetic members 1007 interact with the magnetic paths 1040. In the illustrated embodiment, each coupling region 1080 extends from the equatorial plane 1084 to an apex of the sphere 1050, and includes, at any given time, approximately one fourth of the ring 1064. Accordingly, in embodiments where the transverse ring 1064 rotates in a clockwise direction in the view shown, the magnetic members 1007 can couple with the upper path 1040 at about the equatorial plane 1084 and can ascend to the apex of the sphere 1050. In FIG. 16, one magnetic member 1007 is shown being coupled with the upper path 1040 near the equatorial plane 1084 and another magnetic member 1007 is shown being decoupled from the upper path 1040 near the upper pole. The magnetic members 1007 can decouple from the sphere 1050 at about the apex and can remain decoupled during the descent from the apex to the equatorial plane 1084. In such an arrangement, the sphere 1050 can rotate in a clockwise direction, as viewed from above, as the ring 1064 rotates in the stated clockwise direction. At the equatorial plane 1084, the magnetic member 1007 can be coupled with the lower magnetic path 1084, can remain coupled therewith throughout the lower coupling region 1080, and can be decoupled from the lower magnetic path 1040 at the lower pole of the sphere 1050.

In other embodiments, the system 1000 may include only a single coupling region 1080, which may extend about one fourth of the sphere 1050. For example, only one of the upper and lower hemispheres 1055, 1057 may include a magnetic path 1040.

The leverage between a magnetic member 1007 and a path 1040 can be greater near the equatorial plane 1084 than it is at the apex of the sphere 1050. This can result from the fact that path 1040 is spaced from the rotational axis 1082 at the equatorial plane 1084, and this spacing decreases toward the apex. As a result, a moment arm associated with the path 1040 decreases in size as the magnetic member 1007 progresses from a position at the equatorial plane 1084 toward the apex. The illustrated embodiment is described in an attraction mode of operation. It is possible for the system 1000 to be configured for operation in a repulsion mode of operation, in manners such as described above.

Figure 17A:
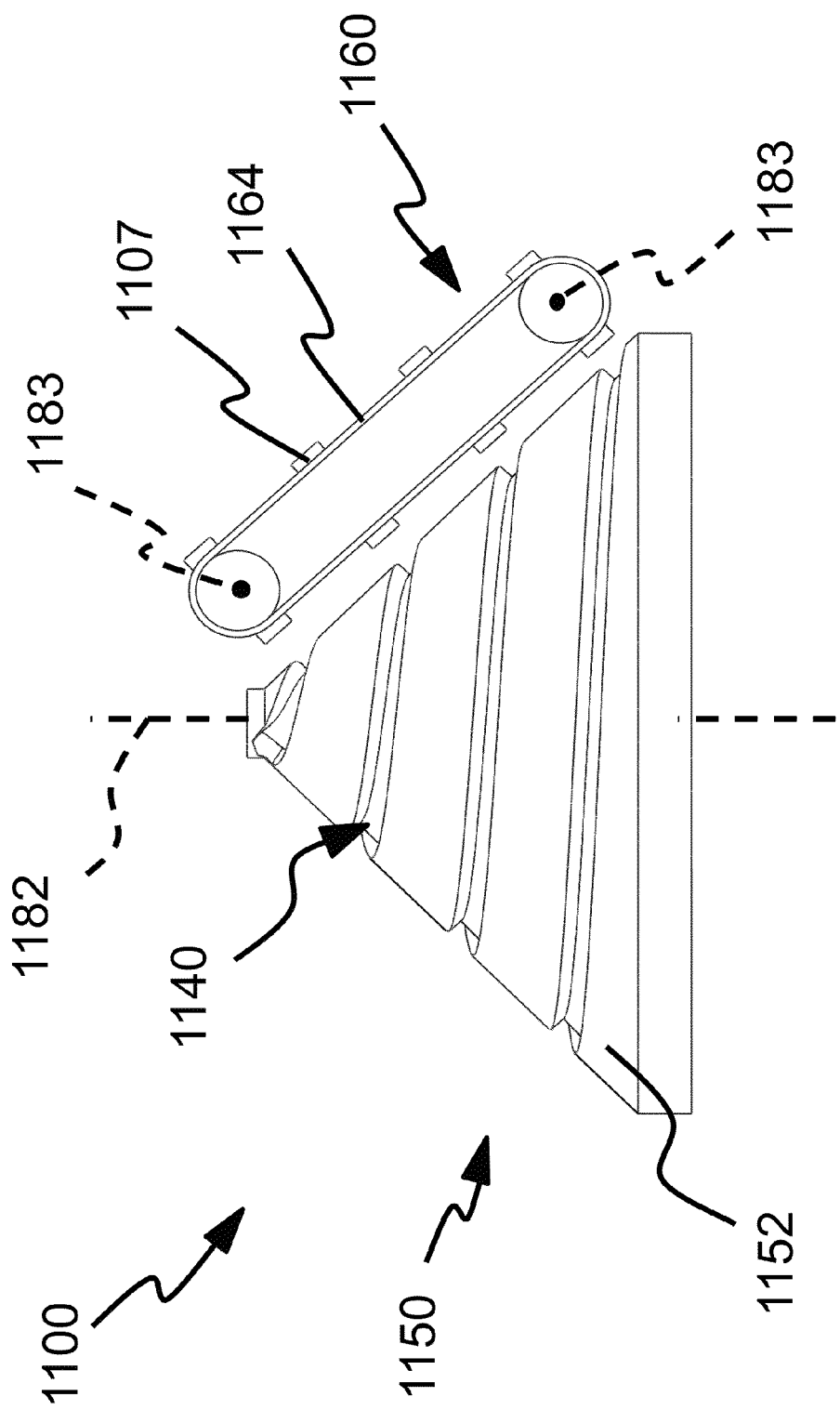
FIG. 17A is an elevation view of another embodiment of a system configured to continuously convert magnetic energy into rotational energy.

FIG. 17A illustrates another embodiment of a system 1100 that can resemble other systems described herein. The system 1100 includes a rotational member 1150 and a coupling/decoupling assembly or transverse assembly 1160. The rotational member 1150 is configured to rotate about a rotational axis 1182, and the transverse assembly 1160 is configured to rotate about two transverse rotational axes 1183. The axes 1183 can be substantially perpendicular to a plane that includes the rotational axis 1182 of the rotational member 1150.

The illustrated rotational member 1150 defines a geometry different from those described above. Any suitable geometry is possible. In the illustrated embodiment, the rotational member 1150 comprises a cone 1152. The cone 1152 can include any suitable number of magnetic paths 1140, which can resemble any of the magnetic paths described above. In the illustrated embodiment, a single magnetic path 1140 is present on the rotational member 1150, and the magnetic path 1140 is substantially helical and angles upwardly from a base of the cone 1152 toward an apex of the cone 1152.

The transverse assembly 1160 includes a plurality of magnetic members 1107 that are mounted to a belt 1164, and thus can resemble the transverse assembly 660 described above. Any suitable suspension system may be used to mount the belt 1164 in a rotatable fashion. As can be appreciated from the foregoing, the belt 1164 can define a path that is followed by the magnetic members 1107. The path can be suspended above a surface of the cone 1152, and more particularly, above the magnetic paths 1140, such that there is little or no physical contact between the magnetic members 1107 and the paths 1140. Such an arrangement can provide for little or no frictional losses due to contact between the magnetic members 1107 and the paths 1140. The system 1100 can operate in much the same manner as other systems described above.

FIG. 17B illustrates another embodiment of a system 1100' that can resemble other systems described herein, particularly the system 1100 just discussed. The system 1100' includes a rotational member 1150 and a coupling/decoupling assembly or transverse assembly 1160'. The rotational member 1150 can be identical or similar to the rotational member 1150 described above, and can be configured to rotate about a rotational axis 1182. The transverse assembly 1160' is configured to rotate about a rotational axis 1182' that is perpendicular to the rotational axis 1182.

The illustrated rotational member 1150 comprises a cone 1152. The cone 1152 can include any suitable number of magnetic paths 1140, which can resemble any of the magnetic paths described above. In the illustrated embodiment, the magnetic path 1140 is substantially helical and angle upwardly from a base of the cone 1152 toward an apex of the cone 1152.

The transverse assembly 1160' includes a rotational member such as the rotational member 1150. In particular, the transverse assembly 1160' includes a cone 1152', which may be identical or similar to the cone 1152. In the illustrated embodiment, the cone 1152' includes a magnetic member 1107', which is a magnetic path 1140'. The magnetic path 1140' can be identical or similar to the magnetic path 1140. As can be appreciated from other disclosure herein, each of the magnetic paths 1140, 1140' may be referred to as either a magnetic path or as a magnetic member. Stated otherwise, the terms "magnetic member," "magnetically influenced member," or "magnetically influenced component" are sufficiently broad to include within their scope a magnetic path. In some instances, the magnetic paths 1140, 1140' can comprise one or more of a magnetically influenced material (e.g., non-magnetized steel) and one or more magnetic sources (e.g., one or more permanent magnets).

Any suitable suspension system may be used to mount the cones 1152, 1152' in a rotatable fashion. As with other systems described herein, the system 1100 can be configured to operate in either an attraction mode or a repulsion mode.

In some embodiments of an attraction mode system 1100, the magnetic paths 1140, 1140' can be configured to provide a magnetic potential that increases in a direction from the base of the cones 1152, 1152' to the apexes of the cones 1152, 1152'. For example, in some arrangements, the magnetic paths 1140, 1140' can comprise magnetic sources that have a constant strength along a full length of the paths. The paths may be relatively deep near the base of each cone and may gradually become shallower toward the apex of each cone, such that the strength of the attractive interaction between the paths increases toward the apexes. The torque provided by attraction between the base ends of the paths 1140, 1140', which are spaced from the axes 1182, 1182' by a greater amount than are the apex ends of the paths, can be sufficient to overcome the oppositely directed torque at the apex ends and thus decouple the paths 1140, 1140' at the apex ends of the cones.

In some embodiments of repulsive attraction mode systems 1100, the magnetic paths 1140, 1140' can be configured to provide a magnetic potential that decreases in a direction from the apexes of the cones 1152, 1152' to the bases of the cones 1152, 1152'. For example, in some arrangements, the magnetic paths 1140, 1140' can comprise magnetic sources that have a constant strength along a full length of the paths. The paths may be relatively deep near the base of each cone and may gradually become shallower toward the apex of each cone. However, unlike the attractive embodiments just discussed, the interaction between the paths 1140, 1140' is repulsive. The strength of this repulsive interaction between the paths decreases from the apexes toward the bases. The torque provided by repulsion between the base ends of the paths 1140, 1140', which are spaced from the axes 1182, 1182' by a greater amount than are the apex ends of the paths, can be sufficient to overcome the oppositely directed torque at the apex ends and thus couple the paths 1140, 1140' at the apex ends of the cones.

Figure 18:
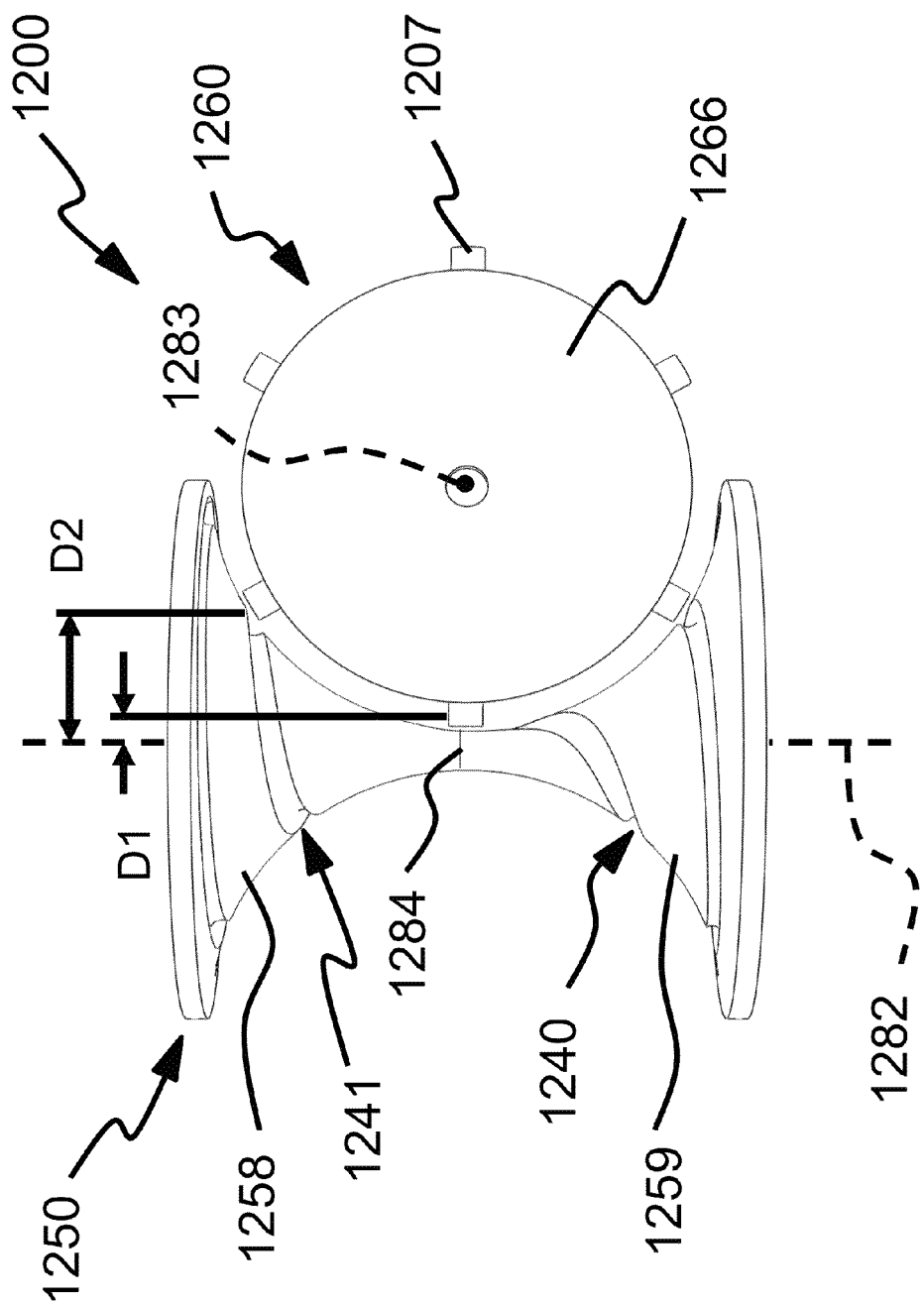
FIG. 18 is an elevation view of another embodiment of a system configured to continuously convert magnetic energy into rotational energy.

FIG. 18 illustrates another embodiment of a system 1200 that can resemble other systems described herein. The system 1200 includes a rotational member 1250 and a coupling/decoupling assembly or transverse assembly 1260. The rotational member 1250 is configured to rotate about a rotational axis 1282, and the transverse assembly 1260 is configured to rotate about a rotational axis 1283. The axis 1283 can be substantially perpendicular to a plane that includes the rotational axis 1282 of the rotational member 1250.

The illustrated rotational member 1250 defines a geometry different from those described above. Any suitable geometry is possible. In the illustrated embodiment, the rotational member 1250 comprises two concavely rounded cones 1258, 1259 that meet at their narrow ends. The term "concavely rounded" as used here indicates that, as viewed from the side (e.g., the elevation view of FIG. 18), the contour of the cones 1258, 1259 is rounded. Indeed, in the illustrated embodiment, the rounded or concave surfaces of the cones cooperated to define substantially semi-circular concavities, within which a portion of a circular transverse assembly 1260 can fit. In the illustrated embodiment, the transverse assembly 1260 comprises a circular disk 1266, which has a diameter slightly smaller than a diameter of the circular concavities formed by the rotational member 1250. The cones 1258, 1259 can be fixedly attached to each other (e.g., may comprise an integral unit) so as to rotate uniformly.

The transverse assembly 1260 includes a plurality of magnetic members 1207 that are mounted to the disk 1266, and thus can resemble the transverse assembly 860 described above. Any suitable suspension system may be used to mount the disk 1266 in a rotatable fashion. As can be appreciated from the foregoing, the disk 1266 can assist in defining a path that is followed by the magnetic members 1207. The path can be spaced from the concave surfaces of the cone 1258, 1259.

The upper and lower cones 1258, 1259 can include any suitable number of magnetic paths 1240, 1241 which can resemble any of the magnetic paths described above. In the illustrated embodiment, the magnetic paths 1240 are substantially helical and angle from a base of a cone 1258, 1259 toward an apex of the cone 1258, 1259. The disk 1266 can be positioned so as to space the magnetic members 1207 from the magnetic paths 1240, 1241 such that there is little or no physical contact between the magnetic members 1207 and the paths 1240, 1241. Such an arrangement can provide for little or no frictional losses due to contact between the magnetic members 1207 and the paths 1240.

Unlike previous embodiments, however, one magnetic path 1240, 1241 can be configured for attractive magnetic interaction with the magnetic member 1207, whereas the other magnetic path 1240, 1241 can be configured for repulsive magnetic interaction with the magnetic member 1207. In the illustrated embodiment, the magnetic path 1240 is an attraction path and the magnetic path 1241 is a repulsion track. The magnetic paths 1240, 1241 may meet at an equatorial plane 1284 of the rotational member 1250, or in other embodiments, one or more of the magnetic paths 1240, 1241 may be spaced from the equatorial plane 1284. In still other or further embodiments, one or more of the magnetic paths 1240, 1241 may extend from one side of the equatorial plane 1284 to the other.

Leverage principles such as discussed above can apply to operation of the system 1200. For example, in the illustrated embodiment, a magnetic member 1207 can be coupled with the lower magnetic path 1240 at the lower end of the cone 1259. The torque provided by the magnetic interaction between the magnetic member 1207 and the lower end of the magnetic path 1240 (which is spaced further from the axis 1282 than is the upper end of the magnetic path 1240), the rotational inertia of the rotational member 1250, and/or the rotational inertia of the disk 1266 can be sufficient to decouple a magnetic member 1207 that is at the upper end of the magnetic path 1240. However, the magnetic member 1207 that is decoupled from the attractive magnetic path 1240 is then coupled with the repulsive magnetic path 1240, which can require further expenditure of energy. In some embodiments, this decoupling and coupling may take place at approximately the same time or position, such as when the attractive lower magnetic path 1240 leads directly into the repulsive upper magnetic path 1241. In other embodiments, there may be a slight delay and/or movement of the magnetic member 1207 from the decoupling to the coupling stage.

The energy for coupling the magnetic member 1207 with the repulsive magnetic path 1240 may be provided by one or more of the torque provided by the magnetic interaction between a magnetic member 1207 and the lower end of the attractive magnetic path 1240 (which is spaced further from the axis 1282 than is the lower end of the repulsive magnetic path 1241), the rotational inertia of the rotational member 1250, the rotational inertia of the disk 1266, and or repulsion of an additional magnetic member 1207 that has been advanced further along the repulsive magnetic path 1241. For example, in the illustrated embodiment, an upper magnetic member 1207 can be at a distance D2 from the axis 1282 when an additional magnetic member 1207 that is being coupled with the repulsive magnetic path 1241 is only a distance D1 from the rotational axis 1282. The torque provided by the repulsive force between the magnetic member 1207 and the magnetic path 1241 may provide (or assist in providing) sufficient force for coupling of the additional magnetic member.

In view of the foregoing, it may be said that the system 1200 operates simultaneously in an attraction mode and in a repulsion mode. It is possible to alter the order and placement of the magnetic paths 1240, 1241 from those shown and described. Other suitable alterations to the system 1200 are also possible.

FIGS. 19A-19D illustrate another embodiment of a system 1300 that can resemble other systems described herein. The various drawings illustrate the system 1300 in different phases of operation. The system 1300 includes a rotational member 1350 and a coupling/decoupling assembly or transverse assembly 1360. The rotational member 1350 is configured to rotate about a rotational axis 1382, and the transverse assembly 1360 includes a carriage 1363 that is configured to reciprocate along a rail system, which, in the illustrated embodiment, includes two parallel rods 1361. The rods 1361 can be substantially perpendicular to a plane that includes a rotational axis 1382 of the rotational member 1350. The rods 1361 can define a fixed orientation, and the rotational member 1350 can be configured to rotate relative to the rods 1361. In some embodiments, the system 1360 includes an axle 1392 about which the rotational member 1350 can rotate, or in other instances, which can be fixedly attached to the rotational member 1350 so as to rotate therewith.

The illustrated rotational member 1350 can define any suitable geometry. In the illustrated embodiment, the rotational member 1350 comprises a disk 1352. The disk 1352 can include any suitable number of magnetic paths 1340, which can resemble any of the magnetic paths described above. In the illustrated embodiment, a single magnetic paths 1340 is used, which is substantially helical.

The transverse assembly 1360 can include any suitable number of magnetic members 1307, which can be mounted to the carriage 1363. In the illustrated embodiment, two separate magnetic members 1307 are attached to the carriage—one at either end thereof. The carriage 1363 can define a slot or opening 1369 that can pass freely over the axle 1392. For example, in some embodiments, the opening 1369 can have a greater width than a diameter of the axle 1392 so as to reduce or avoid friction between these components.

Any suitable system may be used to mount the rods 1361 in a fixed or stationary fashion. As can be appreciated from the foregoing, the rods 1361 and the carriage 1363 can define a path that is followed by the magnetic members 1307. The path can be suspended above a surface of the disk 1352, and more particularly, above the magnetic path 1340, such that there is little or no physical contact between the magnetic members 1307 and the paths 1340. Such an arrangement can provide for little or no frictional losses due to contact between the magnetic members 1307 and the paths 1340.

The carriage 1363 can be configured to move back and forth freely on the rods in a linear direction. In some embodiments, movement of the carriage 1363 can be delimited. For example, in some embodiments, any suitable stop mechanism (not shown) can be included at either end of the rods 1361. As a result, the magnetic member 1307 may only be able to move outwardly to a position above a maximum displacement edge 1390 of the disk 1352, which is depicted schematically by a broken circle in FIGS. 19A-19D.

In various embodiments, the magnetic members 1307 can be equal in terms of magnetically interactive influence. For example, in some embodiments, the magnetic members 1307 may be magnetic sources of equal strength. In other embodiments, the magnetic members 1307 may be magnetically influenced material of equal size, shape, and density.

Figures 19A, 19B:
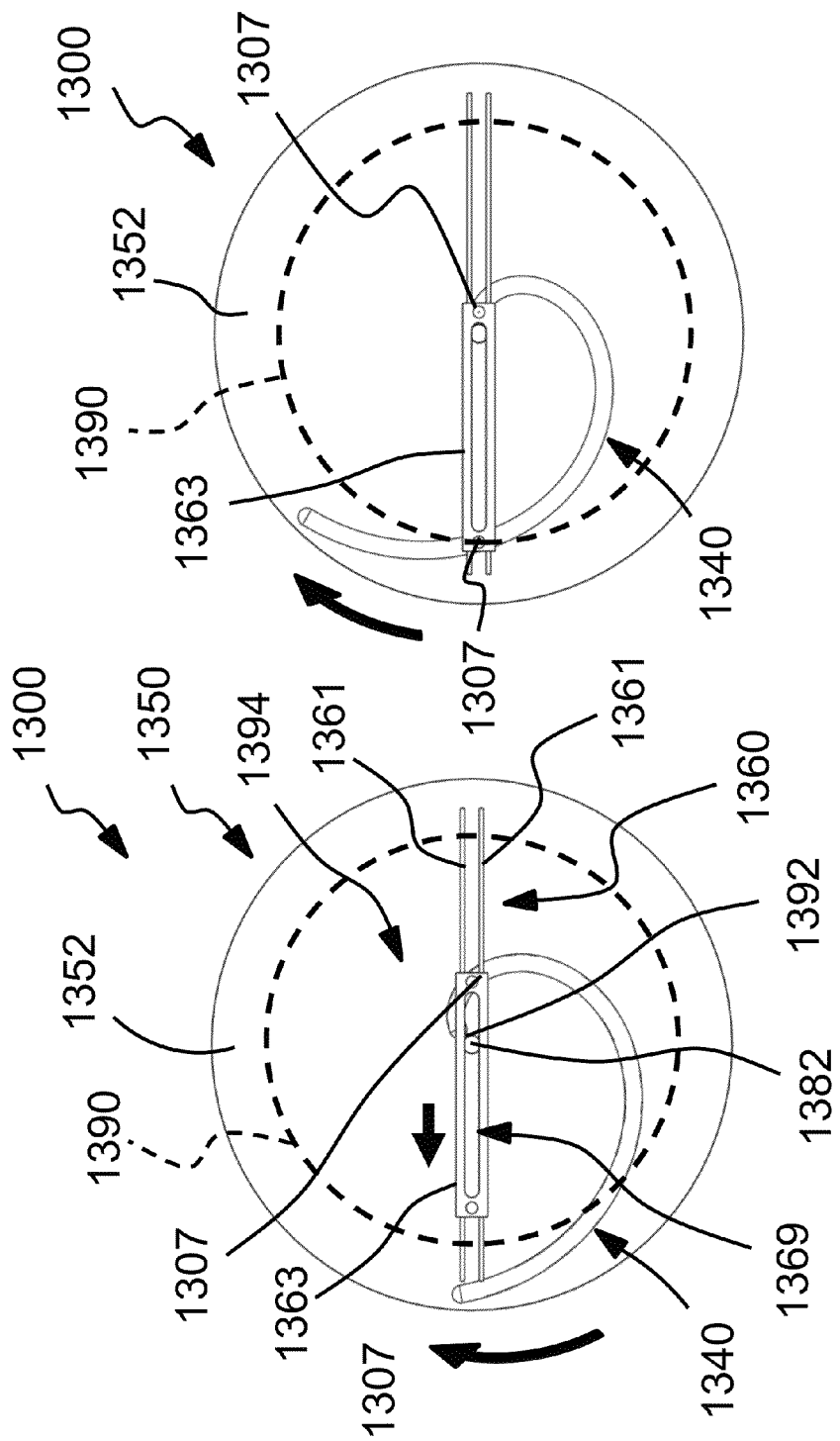

Operation of the system 1300 will now be described with reference to the various drawings. In FIG. 19A, the left magnetic member 1307 is attracted to the outermost end of the magnetic path 1340, and the right magnetic member 1307 is urged leftward due to interaction with the magnetic path 1340 with which it is coupled.

In FIG. 19B, the left magnetic member 1307 is coupled with the magnetic path 1340 at the region thereof that intersects the maximum displacement edge 1390 of the disk 1352. At this position, the carriage 1363 has come to a stop and is ready to reverse directions. Interaction between the left magnetic member 1307 and the magnetic path 1340 urges the carriage 1363 to the right and also causes rotation (or continued rotation) of the disk 1352 in the clockwise direction. The torque provided to the disk 1352 by the left magnetic member 1307 and/or the rotational inertia of the disk 1352 can be sufficient to overcome the oppositely directed torque provided by the right magnetic member 1307 at the inner end of the magnetic path 1340.

Accordingly, as shown in FIG. 19C, the right magnetic member 1307 can be decoupled from the magnetic path 1340 and the carriage 1363 can move rightward. Interaction between the left magnetic member 1307 and the magnetic path 1340 can continue to urge the carriage 1363 rightward and can cause continued rotation of the disk 1352.

FIG. 19D is analogous to FIG. 19A, as it shows the right magnetic member 1307 being attracted to the magnetic path 1340 and the left magnetic member moving to the inner end of the magnetic path 1340. That is, just as FIG. 19A shows the left and right magnetic members 1307 just prior to being coupled with and decoupled from the magnetic path 1340, respectively, so does FIG. 19D show the right and left magnetic members 1307 just prior to being coupled with and decoupled from the magnetic path 1340, respectively. The sequence of FIGS. 19B and 19C will likewise be reversed, such that the carriage 1363 will come to a stop at the right end of the rods 1361 and will then reverse direction and move toward the left end of the rods 1361. The carriage 1363 will thus reciprocate along the rods 1361 and the disk 1352 will continue to rotate in the clockwise direction.

With reference again to FIG. 19A, in certain embodiments, it may be stated that the portion of the magnetic path 1340 that is located inside the maximum displacement edge 1390 of the disk 1352 is in a neutral zone 1394, since the magnetic members 1307 on the carriage 1363 and the magnetic path 1340 remain at a relatively constant distance from each other. The portion of the magnetic path 1340 that is outside of the maximum displacement edge 1390, however, can create a potential for instigating or continuing rotation of the disk 1352, as the magnetic members 1307 are attracted to this portion of the magnetic path 1340 but are stopped from translating into a position that is closer thereto. Thus, a varying distance in the radial direction outside the maximum displacement edge 1390 creates the potential attractive force to produce rotation. There are many ways to produce such a varying distance (or potential attractive force), so this example should not necessarily be limiting.

Stated otherwise, in certain embodiments, the entire magnetic path 1340 is on the same plane and does not vary into or out of the page. The magnetic members 1307 are also on a common plane that is parallel to the plane at the surface of the magnetic path 1340. The neutral zone 1394 is the location on the disk 1352 inside of the maximum displacement edge 1390. Since the interaction between the magnetic members 1307 and the magnetic path 1340 are maintained an equal distance apart, there may be no potential to rotate the disk 1352. The zone outside of the maximum displacement edge 1390 thus may be thought of as a potential zone, or as a non-neutral zone. For example, as shown in FIG. 19A, the left magnetic member 1307 is attracted to the outer end of the magnetic path 1340, which causes the disk 1352 to rotate in a clockwise direction and continue to rotate in this direction until the magnetic path 1340 intersects with the maximum displacement edge 1390 at the position of the magnetic member 1307. At this position of alignment or intersection, the torque generated at the outer portion of the disk 1352 is greater than the resistive break-away torque generated near the center of the disk 1352, which allows the disk 1352 to continue spinning in a clockwise direction.

In order to overcome the energy losses due to friction in the system, it is possible to increase the imbalance of torques at the outer and inner regions of the magnetic path 1340, such as by making the disk 1352 larger in diameter. In various embodiments, the moment arms at the outer and inner regions of the magnetic path 1340 at which coupling and decoupling occurs, respectively, are no less than about 3:1, 4:1, or 5:1.

As with other embodiments disclosed herein, any suitable alteration is possible. For example, in other embodiments, the system 1300 can operate in a repulsion mode, rather than the attraction mode just described. In certain of such embodiments, additional constraints may be provided to the carriage 1363 so as to prevent it from being forced from the rods 1361. For example, in certain of such embodiments, rods 1361 may extend through the carriage 1363, and any suitable system may be used to reduce friction between the rods 1361 and the carriage 1363 (e.g., wheels, ball bearings, friction-reducing coatings, magnetic levitation, etc.).

FIG. 20 depicts another embodiment of a system 1400 that can resemble other systems described herein. The system 1400 includes a plurality of systems (or subsystems), such as the systems 1300 just described, that are connected to each other via a common shaft or axle 1392. In the illustrated embodiment, four such systems 1301, 1302, 1303, 1304 are attached to each other in this manner. The system 1400 can produce greater torque than may be achieved via any one of the systems 1301, 1302, 1303, 1304 on its own. In some embodiments, the systems 1301, 1302, 1303, 1304 can be clocked, or angularly offset, relative to each other. The angular offset can be of any suitable amount. For example, in various embodiments, adjacent systems 1301, 1302 can be angularly offset relative to each other by no more than about 10, 15, 20, 30, or 45 degrees. Any suitable number of subsystems 1301 may be used. In some embodiments, having multiple subsystems that are angularly offset relative to each other can yield a greater uniformity in rotation of the system 1400, as compared with any subsystem on its own. For example, a system 1400 that includes 36 systems, with each adjacent set of subsystems being offset relative to each other by 10 degrees, may produce a more uniform rotation of the common axle 1392 than may be achieved by any single subsystem on its own.

As previously discussed, one operational feature of certain systems disclosed above is a difference in torque or leverage that exists at an outer region of a rotational member as compared with an inner region of the rotational member. This difference can allow for magnetic interactions of larger magnitudes at the inner region to be offset or overcome by magnetic interactions of smaller magnitudes at the outer region, since the magnetic interactions of smaller magnitude have a greater mechanical advantage. Another operational feature of certain systems is the rotational inertia of the rotational member. Rotational members in which mass is concentrated further from the axis of rotation have higher rotational inertia. Such systems can require more energy to initially set in motion, but can require less energy to maintain in motion. In some embodiments, the system may only be self-sustaining once the rotational member has been accelerated to a threshold rotational velocity. In such systems, external energy may be applied to the system during startup so as to achieve the threshold rotational velocity of the rotational member, and rotation of the rotational member can thereafter be sustained by interaction between the rotational member and the transverse assembly. The foregoing operational features (i.e., leverage imbalances and rotational inertia) may be interrelated, in some instances. One or more of the operational features can be adjusted to achieve a desired startup and/or sustained operational performance for the system.

Any of the systems disclosed herein can be arranged so as to operate in either of an attraction mode and a repulsion mode. Moreover, in some embodiments, the magnetic paths may include one or more discreet magnetic members, whereas the transverse assemblies can define one or more magnetic paths.

It will be understood by those having skill in the art that changes may be made to the details of the above-described embodiments without departing from the underlying principles presented herein. For example, any suitable combination of various embodiments, or the features thereof, is contemplated. It is noted that like features of the various systems are identified with like reference numerals, where the leading digit has been incremented. Relevant disclosure set forth above regarding similarly identified features thus may not have been repeated with respect to each embodiment. Moreover, specific features of certain embodiments may not be shown or identified by a reference numeral in the drawings or specifically discussed in the written description with respect to other embodiments. However, such features may clearly be the same, or substantially the same, as features depicted in the other embodiments and/or described with respect to such embodiments. Accordingly, the relevant descriptions of such features apply equally to all embodiments. Any suitable combination of the features and variations of the same described with respect to one embodiment may be employed with another embodiment.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles of the invention.

The invention claimed is:

1. A system comprising:
    a rotational member that is configured to rotate about an axis, wherein the rotational member comprises a magnetically interactive path that extends between an outer position that is at a first distance from the axis and an inner position that is at a second distance from the axis, wherein the first distance is greater than the second distance; and
    a transverse assembly that comprises one or more magnetically interactive members that travel in a radial direction from the outer position to the inner position of the magnetically interactive path of the rotational member, wherein movement of the one or more magnetically interactive members causes the rotational member to rotate about its axis due to magnetic attraction between the one or more magnetically interactive members of the transverse assembly and the magnetically interactive path of the rotational member,
    wherein the magnetic attraction between the magnetically interactive path of the rotational member and the one or more magnetically interactive members of the transverse assembly is such that a torque generated at the outer position of the magnetic path is greater than an opposing torque generated at the inner position of the magnetic path such that the rotational member continues to rotate due to the imbalance of the opposing torques.

2. The system of claim 1, wherein the transverse assembly is configured to constrain the one or more magnetically interactive members from moving in a tangential direction relative to the rotational member.

3. The system of claim 1, wherein the one or more magnetically interactive members comprise a magnetic path.

4. The system of claim 1, wherein the transverse assembly comprises one or more components that are configured to rotate about an axis that is substantially perpendicular to an axis that contains the axis of the rotational member.

5. The system of claim 1, wherein the one or more magnetically interactive members are coupled with the magnetic path at its outer position and the one or more magnetically interactive members are decoupled from the magnetic path at its inner position.

6. The system of claim 5, wherein coupling of a magnetically interactive member of the transverse assembly to the magnetically interactive path of the rotational member occurs when another magnetically interactive member of the transverse assembly is decoupled from the magnetically interactive path of the rotational member.

7. The system of claim 1, wherein the magnetically interactive members of the transverse assembly are configured to be repeatedly coupled and decoupled relative to the magnetically interactive path of the rotational member so as to maintain rotation of the rotational member without introducing energy into the system from an outside source.

8. A system comprising:
    a rotational member that is configured to rotate about an axis, wherein the rotational member comprises a magnetically interactive path that extends between an outer position that is at a first distance from the axis and an inner position that is at a second distance from the axis, wherein the first distance is greater than the second distance; and
    a transverse assembly that comprises one or more magnetically interactive members that travel in a radial direction from the inner position to the outer position of the magnetically interactive path of the rotational member, wherein the movement of the one or more magnetically interactive members causes the rotational member to rotate about its axis due to magnetic repulsion between the one or more magnetically interactive members of the transverse assembly and the magnetically interactive path of the rotational member,
    wherein the magnetic repulsion between the magnetically interactive path of the rotational member and the one or more magnetically interactive members of the transverse assembly is such that a torque generated at the outer position of the magnetic path is greater than an opposing torque generated at the inner position of the magnetic path such that the rotational member continues to rotate due to the imbalance of the opposing torques.

9. The system of claim 8, wherein the transverse assembly is configured to constrain the one or more magnetically interactive members from moving in a tangential direction relative to the rotational member.

10. The system of claim 8, wherein the one or more magnetically interactive members comprise a magnetic path.

11. The system of claim 8, wherein the transverse assembly comprises one or more components that are configured to rotate about an axis that is substantially perpendicular to an axis that contains the axis of the rotational member.

12. The system of claim 8, wherein the one or more magnetically interactive members are coupled with the magnetic path at its inner position and the one or more magnetically interactive members are decoupled from the magnetic path at its outer position.

13. The system of claim 12, wherein coupling of a magnetically interactive member of the transverse assembly to the magnetically interactive path of the rotational member occurs when another magnetically interactive member of the transverse assembly is decoupled from the magnetically interactive path of the rotational member.

14. The system of claim 8, wherein the magnetically interactive members of the transverse assembly are configured to be repeatedly coupled and decoupled relative to the magnetically interactive path of the rotational member so as to maintain rotation of the rotational member without introducing energy into the system from an outside source.

15. A system comprising:
    a rotational member that is configured to rotate about an axis, wherein the rotational member comprises a magnetically interactive path, wherein at least a portion of the magnetically interactive path extends between an outer position and an inner position, wherein the outer position is at a first distance from the axis and the inner position is at a second distance from the axis, and wherein the first distance is greater than the second distance; and a transverse assembly that comprises a magnetically interactive member, wherein magnetic interaction between the magnetically interactive member and the magnetic path causes the magnetically interactive member to move along the magnetic path in one of an inward direction and an outward direction, wherein the transverse assembly is configured to permit magnetic interaction between the magnetically interactive member and the magnetic path to cause the rotational member to rotate or to continue rotating about the axis as the magnetically interactive member moves along the magnetic path, wherein the transverse assembly is configured to decouple the magnetically interactive member from the magnetically interactive path at one of the inner and outer positions after the magnetically interactive member has moved along the path, and wherein the transverse assembly is configured to re-coupled the magnetically interactive member to the magnetically interactive path at the other of the inner and outer positions so as to permit the magnetically interactive member to move along the path again to thereby maintain rotation of the rotational member.

16. The system of claim 15, wherein the transverse assembly is configured to constrain the magnetically interactive member from moving in a tangential direction relative to the rotational member.

17. The system of claim 15, wherein the magnetically interactive member comprises a magnetic path.

18. The system of claim 15, wherein the transverse assembly comprises one or more components that are configured to rotate about an axis that is substantially perpendicular to an axis that contains the axis of the rotational member.

19. The system of claim 18, wherein the transverse assembly is configured to repeatedly decouple the magnetically interactive member from the magnetically interactive path and re-couple the magnetically interactive member to the magnetically interactive path so as to continuously maintain rotation of the rotational member without introducing energy into the system from an outside source.

20. The system of claim 15, wherein the transverse assembly comprises a plurality of magnetically interactive members that are configured to attractively interact with the magnetically interactive path so as to follow the magnetically interactive path in the inward direction, wherein the magnetically interactive members are spaced from each other such that a first magnetically interactive member is at the inner position when a second magnetically interactive member is at the outer position, wherein magnetic interaction of the second magnetically interactive member with the magnetically interactive path provides sufficient torque to the rotational member to overcome an oppositely directed torque to the rotational member that arises from magnetic interaction of the first magnetically interactive member with the magnetically interactive path to thereby decouple the first magnetically interactive member from the magnetically interactive path.

21. The system of claim 15, wherein the transverse assembly comprises a plurality of magnetically interactive members that are configured to interact with the magnetically interactive path in a repulsive manner so as to follow the magnetically interactive path in the outward direction, wherein the magnetically interactive members are spaced from each other such that a first magnetically interactive member is at the outer position when a second magnetically interactive member is at the inner position, and wherein magnetic interaction of the first magnetically interactive member with the magnetically interactive path provides sufficient torque to the rotational member to overcome an oppositely directed torque to the rotational member due to magnetic interaction of the second magnetically interactive member with the magnetically interactive path to thereby couple the second magnetically interactive member with the magnetically interactive path.

22. The system of claim 15, wherein rotational inertia of the transverse assembly is sufficient to decouple the magnetically interactive member from the magnetically interactive path and to re-couple the magnetically interactive member with the magnetically interactive path.

23. The system of claim 15, wherein the transverse assembly constrains movement of the magnetically interactive member relative to the rotational member such that the magnetically interactive member moves along a straight line in one of a radially inward direction and a radially outward direction.

24. The system of claim 15, wherein the magnetically interactive path is spiraled.

25. A system comprising:
a rotational member that comprises:
a first disk that defines a surface that bows concavely from an outer edge thereof and that transitions to a concave cone at a center thereof, wherein the first disk is configured to rotate about a first axis; and
a magnetically interactive path that spirals from an outer region of the rotational member to an inner region of the rotational member;
wherein the outer region is at a first distance from the axis and an inner position that is at a second distance from the axis, wherein the first distance is greater than the second distance; and
a transverse assembly that comprises:
a second disk configured to rotate about a second axis that is substantially perpendicular to the first axis of the first disk; and
one or more magnetically interactive members positioned about a perimeter of the second disk, wherein the magnetically interactive members are configured to interact with the magnetically interactive path of the rotational member, and wherein the plurality of magnetically interactive members of the second disk are spaced from each other such that when one of the magnetically interactive members is at a central region of the rotational member, another magnetically interactive member of the second disk is at an outer edge of the rotational member;
wherein magnetic interaction between the first and second disks at the outer edge of the rotational member with the magnetically interactive path provides sufficient torque to the rotational member to overcome an oppositely directed torque that arises from magnetic interaction between the first and second disks at a central region of the rotational member as it is decoupled from the magnetically interactive path;
wherein the magnetically interactive members of the transverse assembly travel in a radial direction from the first distance to the second distance of the rotational member but are constrained in a tangential direction relative to the rotational member, wherein the constrained movement of the transverse assembly causes the rotational member to rotate about its own axis due to the attractive nature of magnetically interactive members of the transverse assembly and the magnetically interactive path of the rotational member; and wherein the magnetically interactive members of the transverse assembly are configured to permit repeated coupling and decoupling of the magnetically interactive path of the rotational member so as to maintain rotation of the rotational member without introducing energy into the system from an outside source.

26. A system comprising:

a rotational member that comprises:
- a first disk that defines a surface that bows concavely from an outer edge thereof and that transitions to a concave cone at a center thereof, wherein the first disk is configured to rotate about a first axis; and
- a magnetically interactive path that spirals from an outer region of the rotational member to an inner region of the rotational member;
- wherein the outer region is at a first distance from the axis and an inner position that is at a second distance from the axis, wherein the first distance is greater than the second distance; and a transverse assembly that comprises:
- a second disk configured to rotate about a second axis that is substantially perpendicular to the first axis of the first disk; and
- one or more magnetically interactive members positioned about a perimeter of the second disk, wherein the magnetically interactive members are configured to interact with the magnetically interactive path of the rotational member, and wherein the plurality of magnetically interactive members of the second disk are spaced from each other such that when one of the magnetically interactive members is at a central region of the rotational member, another magnetically interactive member of the second disk is at an outer edge of the rotational member;

wherein magnetic interaction between the first and second disks at the outer edge of the rotational member with the magnetically interactive path provides sufficient torque to the rotational member to overcome an oppositely directed torque that arises from magnetic interaction between the first and second disks at a central region of the rotational member as it is decoupled from the magnetically interactive path;

wherein the magnetically interactive members of the transverse assembly travel in a radial direction from the second distance to the first distance of the rotational member but are constrained in a tangential direction relative to the rotational members, wherein the constrained movement of the transverse assembly causes the rotational member to rotate about its own axis due to the repulsive nature of magnetically interactive members of the transverse assembly and the magnetically interactive path of the rotational member; and wherein the magnetically interactive members of the transverse assembly are configured to permit repeated coupling and decoupling of the magnetically interactive path of the rotational member so as to maintain rotation of the rotational member without introducing energy into the system from an outside source.

* * * * *